US009471001B2

United States Patent
Iijima et al.

(10) Patent No.: US 9,471,001 B2
(45) Date of Patent: Oct. 18, 2016

(54) OPTICAL WRITING DEVICE AND IMAGE FORMING DEVICE

(71) Applicant: Konica Minolta, Inc., Chiyoda-ku, Tokyo (JP)

(72) Inventors: Masayuki Iijima, Okazaki (JP); So Yano, Ibaraki (JP); Yasushi Nagasaka, Okazaki (JP); Takaki Uemura, Seto (JP); Takahiro Matsuo, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/921,290

(22) Filed: Oct. 23, 2015

(65) Prior Publication Data

US 2016/0124337 A1 May 5, 2016

(30) Foreign Application Priority Data

Nov. 4, 2014 (JP) ................................ 2014-224355

(51) Int. Cl.

| G03G 15/043 | (2006.01) |
|---|---|
| G02B 3/00 | (2006.01) |
| H04N 1/00 | (2006.01) |
| H04N 1/32 | (2006.01) |

(52) U.S. Cl.
CPC ........... G03G 15/043 (2013.01); G02B 3/0006 (2013.01); H04N 1/00814 (2013.01); H04N 1/32587 (2013.01)

(58) Field of Classification Search
CPC .............. G03G 15/043; G03G 15/04; G03G 15/04036; G03G 15/04072; G03G 15/0415; G03G 13/04; G03G 15/0189; G03G 15/5008; G03G 2215/00599; G03G 2215/0132; G03G 2215/0141; G02B 26/124; G02B 26/123
See application file for complete search history.

(56) References Cited

U.S. PATENT DOCUMENTS

| 2006/0012670 A1* | 1/2006 | Tsujino ...................... B41J 2/45 347/251 |
| 2011/0150510 A1* | 6/2011 | Kondo ................. G03G 15/043 399/51 |
| 2014/0002564 A1* | 1/2014 | Miyadera ............... G03G 13/04 347/118 |
| 2014/0064781 A1* | 3/2014 | Hashimoto ........ G03G 21/1666 399/110 |
| 2014/0232805 A1* | 8/2014 | Watanabe ........ G03G 15/04054 347/130 |

FOREIGN PATENT DOCUMENTS

| JP | 2004-098317 A | 4/2004 |
| JP | 2005-059356 A | 3/2005 |
| JP | 2006-130663 A | 5/2006 |

* cited by examiner

*Primary Examiner* — Roy Y Yi
(74) *Attorney, Agent, or Firm* — Buchanan Ingersoll & Rooney PC

(57) ABSTRACT

An optical writing device including light-emitting elements forming element arrays. The element arrays are each composed of light-emitting elements arranged in line in a main scanning direction, and reside at respective positions along a sub-scanning direction. A correction unit receives signal values in one-to-one correspondence with the light-emitting elements and performs correction to acquire corrected signal values each indicating a light amount of a corresponding light-emitting element. The correction is for eliminating a light amount difference in the main scanning direction occurring for each element array. A driving unit supplies driving currents to the light-emitting elements based on the corrected signal values, and a control unit performs a control of causing at least two element arrays to emit light for different durations within one main scanning period. The control is for eliminating a light amount difference in the sub scanning direction occurring between the at least two element arrays.

10 Claims, 13 Drawing Sheets

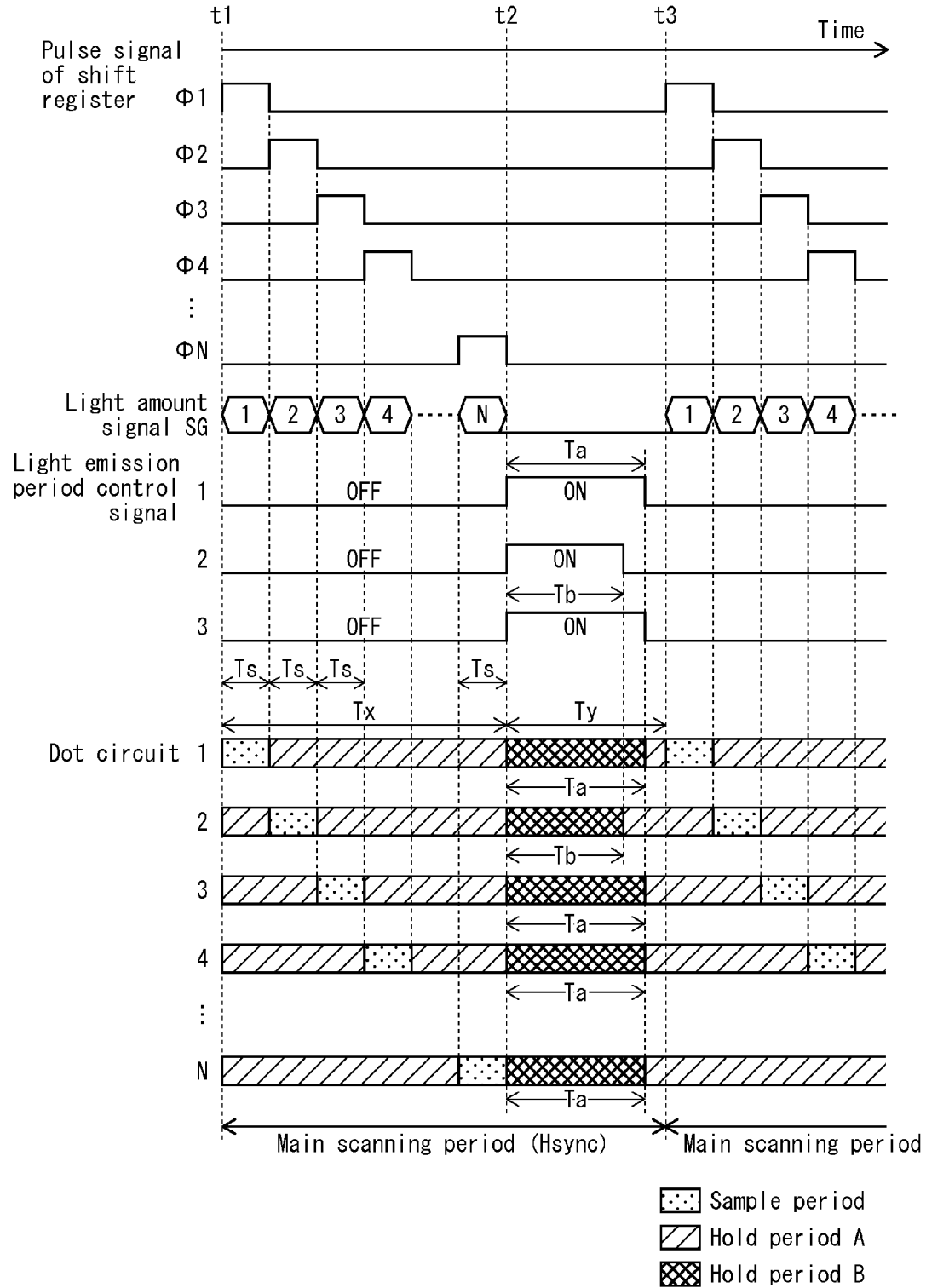

OPTICAL WRITING DEVICE AND IMAGE FORMING DEVICE

This application is based on an application No. 2014-224355 filed in Japan, the contents of which are hereby incorporated by reference.

BACKGROUND OF THE INVENTION (1) Field of the Invention

The present invention relates to an optical writing device and an image forming device that executes writing onto a photoreceptor by light.

(2) Description of the Related Art

Japanese Patent Application Publication No. 2004-98317 is one example of conventional technology disclosing an optical head utilized in image forming devices such as a printer. The optical head includes a rod lens array that collects light emitted by a plurality of light-emitting elements, and exposes a photoreceptor to the light.

FIG. 16 is a schematic planar view illustrating a positional relation of the light-emitting elements and the rod lens array in the optical head pertaining to the exemplar conventional technology discussed above, when the light-emitting elements are viewed from the photoreceptor through the rod lens array.

As illustrated in FIG. 16, in the optical head pertaining to the exemplar conventional technology, a plurality of light-emitting elements 900 are arranged two-dimensionally. That is, the light-emitting elements 900 are arranged to form lines along a main scanning direction. Each of the lines is a light-emitting element array 901, and a plurality of light-emitting element arrays 901 are arranged along a sub scanning direction. A rod lens array 910 collects light emitted from the light-emitting elements 900.

The rod lens array 910 has an elongated shape. The rod lens array 910 is includes a large number of rod lenses 911 each having a diameter larger than the diameter of one light-emitting element 900. The rod lenses 911 are arranged in a zigzag pattern along the main scanning direction.

Due to this structure, the rod lens array 910 has an optical characteristic such that different portions of the rod lens array 910 have different light transmittance levels. Because of this, even when light beams emitted from the two-dimensionally arranged light-emitting elements 900 emit light beams with the same light amount, after the light beams pass through the rod lens array 910, the light beams arrive at regions of a surface of a photoreceptor with different light amounts (i.e., the regions have different light exposure amounts). This results in forming of an image having uneven density.

In order to suppress such uneven density, the above-cited Japanese Patent Application Publication No. 2004-98317 discloses a method for correcting driving currents supplied to light-emitting elements.

The configuration of Japanese Patent Application Publication No. 2004-98317 requires a correction circuit for correcting driving currents supplied to light-emitting elements to have a large dynamic range. The reason for this is described in detail in the following utilizing FIG. 17.

FIG. 17 includes graphs illustrating one example of difference in light amounts of light beams having passed through a rod lens array, in a hypothetical case where light beams emitted from all light-emitting elements of two light-emitting element arrays have the same light amount before passing through the rod lens array. The horizontal axis shows positions along the main scanning direction, and the vertical axis shows light amounts of light beams having passed through the rod lens array.

Graph 931 shows light amounts of light beams emitted from the light-emitting elements 900 of a light-emitting element array 901a. The light-emitting element array 901a is one of the five light-emitting element arrays 901 illustrated in FIG. 16, and is disposed at the center in the sub scanning direction. Graph 931 shows that light beams from the light-emitting elements 900 of the light-emitting element array 901a have light amounts varying from one other after passing through the rod lens array, and that the difference in light amounts indicates a periodical pattern along the main scanning direction. Such light amount difference is hereinafter referred to as a "light amount difference along the main scanning direction". Graph 932 shows that the light amount difference along the main scanning direction also occurs with respect to the light beams emitted from the light-emitting elements 900 of a light-emitting element array 901b. The light-emitting element array 901b is one of the two light-emitting element arrays disposed farthest from the center in the sub scanning direction.

In graphs 931 and 932, "ΔA" indicates levels of the light amount difference along the main scanning direction occurring with respect to the light-emitting element arrays 901a and 901b, respectively.

Furthermore, graphs 931 and 932 indicate that after having passed through the rod lens array, the light beams from the light-emitting element array 901a have greater light amounts than the light beams from the light-emitting element array 901b. This difference in light amounts is illustrated as shift amount AB in the vertical direction in FIG. 17. This difference in light amounts is due to the light-emitting element arrays 901a, 901b having different positions along the sub scanning direction relative to the rod lens array 910, and is hereinafter referred to as a "light amount difference along the sub scanning direction". The light amount difference along the main scanning direction and the light amount difference along the sub scanning direction are caused by the structure of the rod lens array 910 described above and the consequent optical characteristic of the rod lens array 910.

Meanwhile, Japanese Patent Application Publication No. 2004-98317 discloses correcting driving currents supplied to light-emitting elements by correcting values of light amount signals supplied to driving circuits supplying driving currents to light-emitting elements. A light amount signal supplied to a driving circuit indicates the amount of light to be emitted by a corresponding light-emitting element.

When employing this method to suppress both the light amount difference along the main scanning direction and the light amount difference along the sub scanning direction, the light amount signals need to be capable of indicating the maximum light amount in graph 931 and the minimum light amount in graph 932. That is, the light amount signals need to be variable within a relatively great range, corresponding to difference ΔC between the maximum light amount in graph 931 and the minimum light amount in graph 932. Accordingly, a relatively great dynamic range is required for correcting the driving currents, unfortunately.

A greater dynamic range results in, for instance, a necessity of providing a greater number of bits to a digital signal representing light emission amounts of light-emitting elements. Further, the greater the number of bits of the digital signal, the larger a correction circuit becomes, because the number of elements in the correction circuit, such as a logic gate for executing processing such as D/A conversion to the digital signals, increases accordingly. This results in expensive semiconductor elements, such as an IC including the correction circuit, being required.

The above problem is not specific to cases where lenses are used, one example of which being a case where a rod lens array is used. That is, the same problem may occur with any optical writing device in which the light amount difference along the main scanning direction and the light amount difference along the sub scanning direction occur at a photoreceptor.

SUMMARY OF THE INVENTION

The present invention is achieved in view of the above problem, and an aim thereof is to suppress a dynamic range required for correction of driving currents of light-emitting elements and thereby providing an optical writing device that includes a low-cost semiconductor element incorporating a correction circuit, and an image forming device that includes such an optical writing device.

Means for Solving the Problems

In order to achieve the above aim, one aspect of the present invention is an optical writing device including a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to a photoreceptor by utilizing light emitted from light-emitting elements. The optical writing device includes: a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array; a driving unit that supplies driving currents to the respective light-emitting elements, the driving currents being based on the corrected signal values; and a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

In order to achieve the above aim, another aspect of the present invention is an image forming device including: a photoreceptor; and an optical writing device that executes writing of an image onto the photoreceptor by utilizing light. In the image forming device, the optical writing device includes a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to the photoreceptor by utilizing light emitted from light-emitting elements, and the optical writing device includes: a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array; a driving unit that supplies driving currents to the respective light-emitting elements, the driving currents being based on the corrected signal values; and a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

BRIEF DESCRIPTION OF THE DRAWINGS

These and other objects, advantages, and features of the invention will become apparent from the following description thereof taken in conjunction with the accompanying drawings, which illustrate a specific embodiment of the invention.

In the drawings:

FIG. 9 is a timing chart illustrating sample periods and hold periods for dot circuits;

DESCRIPTION OF EMBODIMENTS

The following describes an embodiment pertaining to an optical writing device and an image forming device pertaining to the present invention, taking a tandem-type color printer (hereinafter, referred to simply as a printer) as an example.

<Overall Configuration of Printer>

Figure 1:
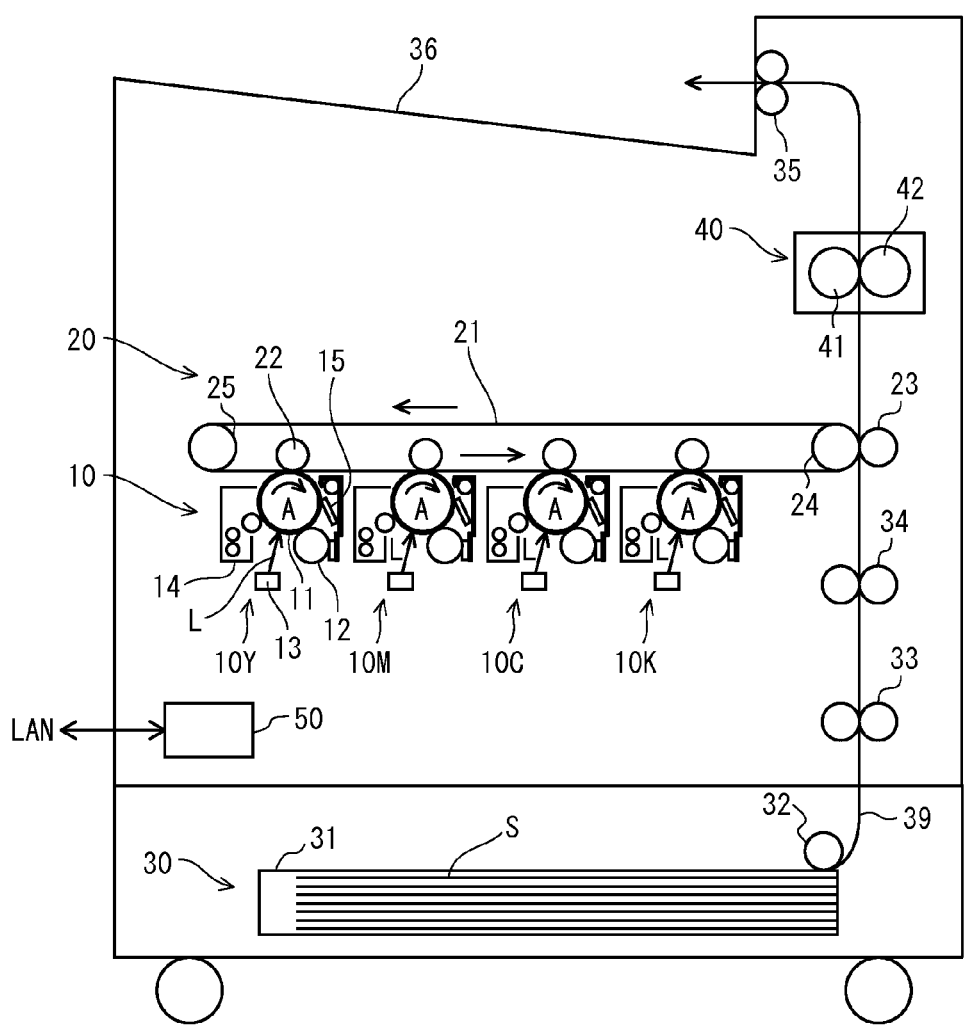
FIG. 1 illustrates a configuration of a printer pertaining to an embodiment.

FIG. 1 is a schematic view of an overall configuration of a printer 5 pertaining to the present embodiment.

As illustrated in FIG. 1, the printer 5 forms images by an electronic photography system, and includes an image processing unit 10, an intermediate transfer unit 20, a paper feed unit 30, a fixing unit 40, and a control unit 50. The printer 5 executes color image forming (printing) in response to a job execution request from an external terminal device (not illustrated) received via a network such as an LAN.

The image processing unit 10 includes image forming units 10Y, 10M, 10C, 10K corresponding to respective developing colors of yellow (Y), magenta (M), cyan (C), and black (K).

The image forming unit 10Y includes a photoreceptor drum 11 as an image carrier, and a charging unit 12, an exposure unit 13, a developing unit 14, a cleaner 15, and so on that are provided surrounding the photoreceptor drum 11.

The charging unit 12 electrically charges a circumferential surface of the photoreceptor drum 11 that rotates in a direction indicated by an arrow A.

The exposure unit (optical writing device) 13 exposes the electrically charged photoreceptor drum 11 to a light beam L to form an electrostatic latent image on the photoreceptor drum 11. Also, the exposure unit 13 includes a print head in which a plurality of organic EL elements (OLEDs) of a current drive type are disposed on a substrate so as to be arranged in a zigzag pattern along a rotational axis direction of the photoreceptor drum 11 (hereinafter referred to as "main scanning direction"). The OLEDs are hereinafter referred to as light-emitting elements. A configuration of the print head is described later.

The developing unit 14 develops the electrostatic latent image, which is formed on the photoreceptor drum 11, by toner of the Y color. As a result, a toner image of the Y color is formed on the photoreceptor drum 11, and the toner image of the Y color is primarily transferred onto an intermediate transfer belt 21 included in the intermediate transfer unit 20. The cleaner 15 cleans residual toner remaining on the photoreceptor drum 11 after the primary transfer. Other image forming units 10M, 10C, 10K have the same configuration as the image forming unit 10Y, and therefore reference numerals thereof are omitted in FIG. 1.

The intermediate transfer unit 20 includes the intermediate transfer belt 21, primary transfer rollers 22, and a secondary transfer roller 23. The intermediate transfer belt 21 is suspended with tension between a driving roller 24 and a driven roller 25 to circularly run in a direction indicated by an arrow in FIG. 1. The primary transfer rollers 22 are disposed to face the respective photoreceptor drums 11 of the image forming units 10Y, 10M, 10C, 10K with the intermediate transfer belt 21 therebetween. The secondary transfer roller 23 is disposed to face the driving roller 24 via the intermediate transfer belt 21.

The paper feed unit 30 includes a cassette 31, a pickup roller 32, and conveyance rollers 33 and 34. The cassette 31 houses therein sheets, specifically, sheets S here. The pickup roller 32 picks up the sheets S from the cassette 31 to a convey path piece by piece. The conveyance rollers 33 and 34 convey the sheets S which are picked up.

The fixing unit 40 includes a fixing roller 41 and a pressure roller 42 that is brought into pressure-contact with the fixing roller 41.

The control unit 50 collectively controls operations of the image processing unit 10, the intermediate transfer unit 20, the paper feed unit 30, and the fixing unit 40 to smoothly execute a job. The control unit 50 executes the following operations for job execution.

That is, the control unit 50 includes a light amount signal output unit 51 (FIG. 3), and causes the light amount signal output unit 51 to generate a digital light amount signal for each of the plurality of light-emitting elements in the exposure unit 13 of each of the image forming units 10Y, 10M, 10C, 10K, based on image data for printing included in the job that the printer 5 receives. Each digital light amount signal indicates an amount of light that the corresponding light-emitting element is to emit (i.e., luminance of the corresponding light-emitting element). The control unit 50 sends the digital light amount signal to the exposure unit 13.

The exposure unit 13 converts the digital light amount signal received from the control unit 50 to an analog light amount signal indicating a voltage, and causes a corresponding light-emitting element to emit a light beam L having a light amount based on the light amount signal.

In each of the image forming units 10Y 10M, 10C, 10K, the light beams L that the light-emitting elements in the exposure unit 13 emit forms an electrostatic latent image on the electrically charged photoreceptor drum 11. The electrostatic latent image forms a toner image when developed by using toner. The toner image is transferred onto the intermediate transfer belt 21 when the primary transfer roller 22 executes primary transfer, due to electrostatic interaction between the primary transfer roller 22 and the intermediate transfer belt 21.

The image forming operations for the colors Y, M, C, K are executed at different timings, beginning from the most upstream color and ending at the most downstream color, such that the respective toner images of the Y, M, C, K colors are multi-transferred in layered form on the same position on the running intermediate transfer belt 21.

In accordance with this image forming timing, the sheets S are conveyed piece by piece by the paper feed unit 30 from the cassette 31 to the secondary transfer roller 23. When a sheet S passes between the secondary transfer roller 23 and the intermediate transfer belt 21, the respective toner images of the Y, M, C, K colors, which are multi-transferred onto the intermediate transfer belt 21, are transferred all at once onto the sheet S by the action of an electrostatic force imposed by the secondary transfer roller 23.

The sheets S, onto which the respective toner images of the Y, M, C, K colors are secondarily transferred, is conveyed to the fixing unit 40. When the sheet S passes between the fixing roller 41 and the pressure roller 42 included in the fixing unit 40, the sheet S is heated and is pressurized. As a result, toner on the sheet S is fused and fixed to the sheet S. After passing through the fixing unit 40, the sheet S is ejected (output) by a paper ejection roller 35 onto a paper ejection tray 36.

<Overall Configuration of Print Head>

Figure 2:
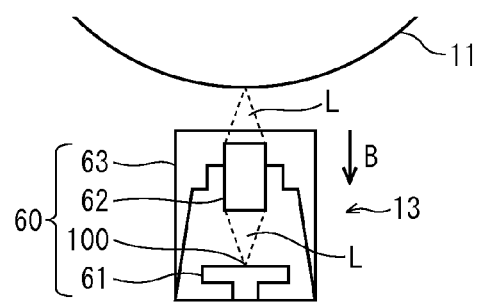
FIG. 2 illustrates an overall configuration of a print head in an exposure unit of the printer.

FIG. 2 schematically illustrates a configuration of a print head 60 included in the exposure unit 13.

As illustrated in FIG. 2, the print head 60 includes an OLED panel 61, a rod lens array 62, and a housing 63 that houses therein the OLED panel 61 and the rod lens array 62.

The OLED panel 61 includes a light emitting unit 100 including a plurality of light-emitting elements arranged in a zigzag pattern along the main scanning direction. Each of the light-emitting elements individually emits a light beam L.

The rod lens array 62 is disposed between the light emitting unit 100 and the photoreceptor drum 11. The light beam L from each light-emitting element passes through different regions on the rod lens array 62, and each of the different regions collects light beams L passing therethrough and exposes the photoreceptor drum 11 to the light beams L.

<Configuration of OLED Panel>

Figure 3:
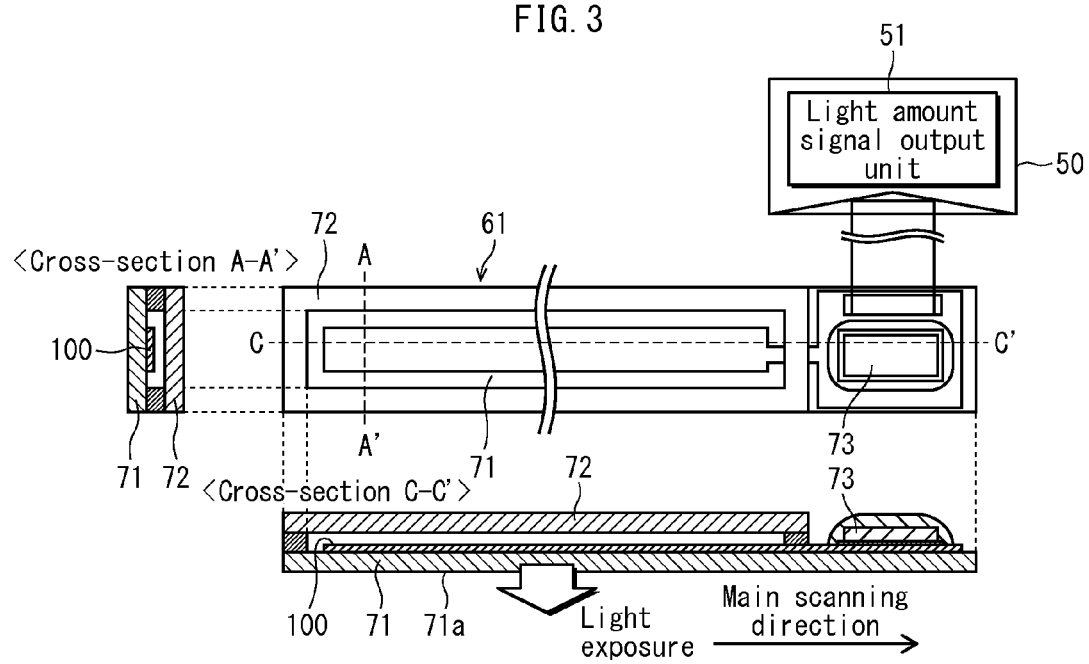
FIG. 3 includes a schematic planar view and a cross-sectional view of an OLED panel inside the print head.

FIG. 3 is a schematic plan view showing the OLED panel 61, including a cross-sectional view taken along line A-A' and a cross-sectional view taken along line C-C'.

As illustrated in FIG. 3, the OLED panel 61 includes a thin film transistor (TFT) substrate 71, a sealing plate 72, and a source IC 73.

The TFT substrate 71 has the light emitting unit 100, which has an elongated shape along the main scanning direction, mounted thereon. In addition, the TFT substrate 71 has provided thereto circuits (hereinafter referred to as dot circuits) each supplying a drive current to a corresponding one of the light-emitting elements in the light-emitting unit 100. The OLED panel 61 has a circuit structure in which these components are formed on the same TFT substrate 71. The light beams L emitted from the light-emitting elements pass through the TFT substrate 71, and are emitted from a surface 71a of the TFT substrate 71. The surface 71a is a surface opposite the surface on which the light-emitting unit 100 is mounted.

The sealing plate 72 is provided for sealing a region on the TFT substrate 71 where the light-emitting unit 100 is mounted, to protect the region from exposure to ambient air.

The source IC 73 is mounted on a region on the TFT substrate 71 where the sealing plate 72 is not provided. The source IC 73 converts the digital light amount signals output from the light amount signal output unit 51 of the control unit 50 to the analog light amount signals each indicating a voltage, and supplies the analog light amount signals to the corresponding dot circuits.

<Positional Relation of Light Emitting Unit and Rod Lens Array>

Figure 4:
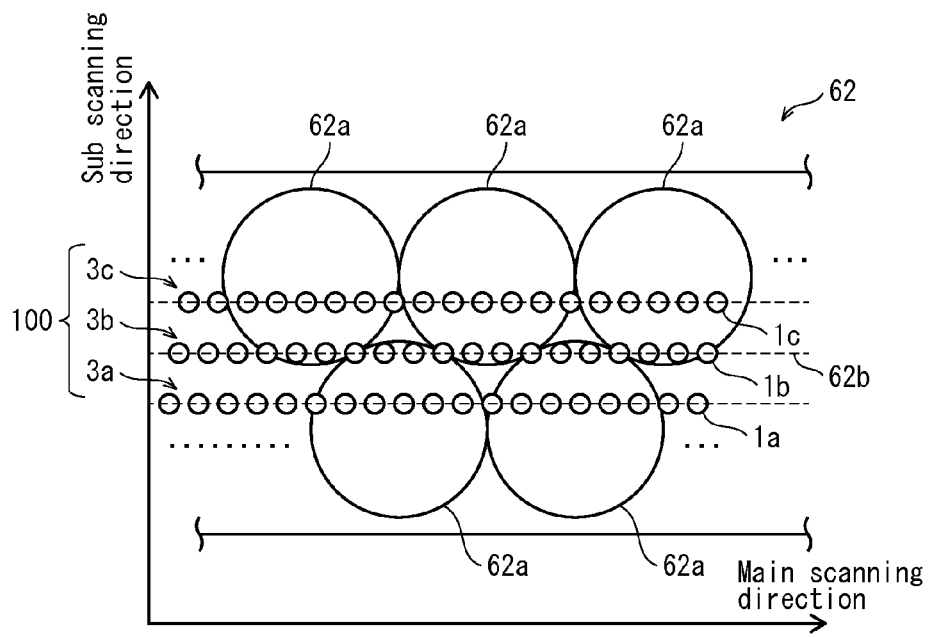
FIG. 4 is a plan view schematically illustrating a positional relation between a light emitting unit and a rod lens array, along a main scanning direction and a sub scanning direction.

FIG. 4 is a plan view schematically illustrating a positional relation between the light emitting unit 100 and the rod lens array 62, along the main scanning direction and the sub scanning direction. That is, FIG. 4 illustrates the light emitting unit 100 when viewed from the direction of an arrow B in FIG. 2, through the rod lens array 62.

As illustrated in FIG. 4, the light emitting unit 100 includes a light-emitting element array 3a, a light-emitting element array 3b, and a light-emitting element array 3c. The light-emitting element array 3a is composed of a plurality of light-emitting elements 1a arranged in line along the main scanning direction. Similarly, the light-emitting element array 3b is composed of a plurality of light-emitting elements 1b arranged in line along the main scanning direction, and the light-emitting element array 3c is composed of a plurality of light-emitting elements 1c arranged in line along the main scanning direction. The light-emitting element array 3a, the light-emitting element array 3b, and the light-emitting element array 3c are arranged along the sub scanning direction. Hereinafter, wherever it is unnecessary to distinguish the light-emitting elements 1a, 1b, 1c from one another, the light-emitting elements 1a, 1b, 1c are simply referred to as light-emitting elements 1. The light-emitting elements 1 have the same shape, size, and characteristics, and are formed by using the same material.

As illustrated in FIG. 4, the light-emitting elements 1 are disposed at respective positions along the main scanning direction so that in a planar view, the light-emitting elements 1 form a zigzag pattern along the main scanning direction.

The rod lens array 62 is composed of a large number of rod lenses 62a arranged to form a zigzag pattern along the main scanning direction. The diameter of each of the rod lenses 62a is larger than the diameter of one light-emitting element 1. In the same manner as the rod lens array 910, different portions of each rod lens 62a which allow light beams L to pass therethrough at different transmittance levels.

Here, a dotted line 62b in FIG. 4 indicates a virtual central axis that passes through the center of the rod lens array 62 in the sub scanning direction. The virtual central axis 62b is parallel to the main scanning direction. The light-emitting element array 3b is disposed at a position corresponding to the virtual central axis 62b. In FIG. 4, the light-emitting element array 3b is disposed so as to overlap with the virtual central axis 62b. The light-emitting element array 3a and the light-emitting element array 3c are disposed along the sub scanning direction so as to be symmetric about the virtual central axis 62b.

<Relation Between OLEDs and Dot Circuits>

Figure 5:
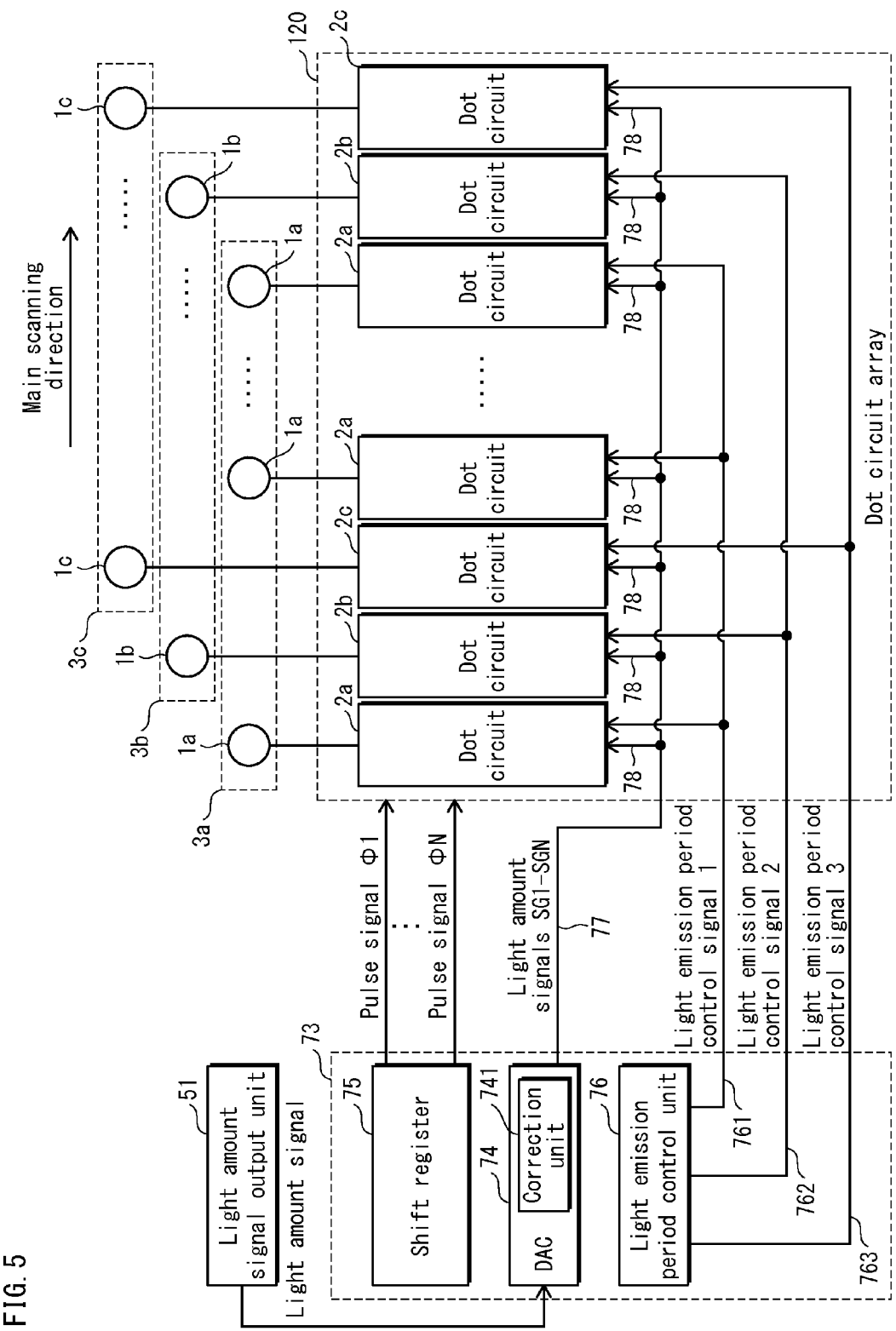
FIG. 5 illustrates a relation between light-emitting elements, dot circuits, and a source IC.

FIG. 5 illustrates relations between the source IC 73, the light-emitting elements 1a, 1b, 1c, and the dot circuits provided to the TFT substrate 71. As illustrated in FIG. 5, the dot circuits include a plurality of dot circuits 2a, a plurality of dot circuits 2b, and a plurality of dot circuits 2c. Each of the dot circuits 2a corresponds to one of the light-emitting elements 1a. Similarly, each of the dot circuits 2b corresponds to one of the light-emitting elements 1b, and each of the dot circuits 2c corresponds to one of the light-emitting elements 1c.

When denoting the total number of the light-emitting elements 1 as N, the total number of the dot circuits is also N. The dot circuits 2a, 2b, 2c basically have the same circuit configuration. Hereinafter, wherever it is unnecessary to distinguish the dot circuits 2a, 2b, 2c from one another, the dot circuits 2a, 2b, 2c are simply referred to as the dot circuits 2.

The dot circuits 2 are arranged adjacent to one another along the main scanning direction, and the N dot circuits 2 compose one dot circuit array 120. Hereinafter, wherever it is necessary to distinguish the dot circuits 2 from one another according to where they are located in the arrangement illustrated in FIG. 5, the leftmost dot circuit is referred to as the first dot circuit 2, the dot circuit immediately to the right of the first dot circuit is referred to as the second dot circuit 2, and the dot circuits 2 further in the right are indicated by using ordinal numbers counting up to N. Thus, the rightmost dot circuit is referred to as the $N^{th}$ dot circuit 2.

The source IC 73 includes a DAC 74, a shift register 75, and a light emission period control unit 76.

The DAC 74 is a digital/analog converter that converts the digital light amount signals from the light amount signal output unit 51 to the analog light amount signals (referred to in the following as light amount signals SG) each indicating a voltage, and outputs the light amount signals SG The DAC 74 also includes a correction unit 741 that corrects the light amount difference along the main scanning direction described above. How the correction unit 741 corrects the light amount difference along the main scanning direction is described later.

The DAC 74 outputs N light amount signals SG1, SG2, SG3, ..., SGN. Each of the N light amount signals SG1, SG2, SG3, ..., SGN corresponds to one of the first, ..., $N^{th}$ dot circuits 2. The DAC 74 outputs the N light amount signals SG1, SG2, SG3, ..., SGN to one signal wiring 77 extending from the DAC 74, one by one each time a predetermined time period Ts elapses (see FIG. 9). When receiving the corresponding one of the N light amount signals SG1, SG2, SG3, ..., SGN, each of the dot circuits 2 causes the corresponding one of the light-emitting elements 1 to emit light. The signal wiring 77 includes branch wirings 78 each branching from a different position thereof in the longitudinal direction, and the N branch wirings 78 are connected in one-to-one correspondence with the dot circuits 2.

The shift register 75 outputs pulse signals φ1 through φN. The pulse signals φ1 through φN switch to level H at different timings. In specific, the timing at which a given pulse signal switches to level H differs from the timing at which a subsequent pulse signal switches to level H by the predetermined time period Ts (see FIG. 9). Each of the pulse signals φ1 through φN is input solely to a dot circuit 2 to which the same number is assigned. For instance, the pulse signal φ1 is input solely to the first dot circuit 2a, the pulse signal φ2 is input solely to the second dot circuit 2b, and the pulse signal φN is input solely to the $N^{th}$ dot circuit 2c.

The timing at which each of the pulse signals φ1 through φN switches to level H is set beforehand so as to be synchronized with the timing at which one of the light amount signals SG1 through SGN having the same number is output from the DAC 74 to the signal wiring 77.

This enables each of the dot circuits 2 to, only when the pulse signal φ that is input thereto rises to level H, sample and be charged with the voltage of the light amount signal SG input thereto (referred to as the holding of a light amount signal by a dot circuit 2). The dot circuits 2 execute the holding of a light amount signal one by one, at timings differing by the predetermined time period Ts.

The light emission period control unit 76 is connected to signal wirings 761, 762, 763 provided respectively for the light-emitting element arrays 3a, 3b, 3c. The light emission period control unit 76 outputs light emission period control signals 1, 2, 3, via the signal wirings 761, 762, 763, respectively. A light emission period control signal that is output via a given one of the signal wirings 761, 762, 763 corrects the light emission period of light-emitting elements included in a light-emitting element array corresponding to the given one of the signal wirings 761, 762, 763. Each of the light emission period control signals 1, 2, 3 is a binary signal that has two values each indicating one of level L and level H. The light emission period control unit 76 simply outputs such binary signals each by using only one bit of data, and thus is implementable with a simple circuit structure.

The light emission period control signal 1 output from the light emission period control unit 76 is input to each of the dot circuits 2a corresponding to the light-emitting elements 1a, namely, the first, fourth, ..., $(N-2)^{th}$ dot circuits 2.

The light emission period control signal 2 is input to each of the dot circuits 2b corresponding to the light-emitting elements 1b, namely, the second, fifth, ..., $(N-1)^{th}$ dot circuits 2. The light emission period control signal 3 is input to each of the dot circuits 2c corresponding to the light-emitting elements 1c, namely, the third, sixth, ..., $N^{th}$ dot circuits 2.

When the light emission period control signal 1 becomes level H, each of the first, ..., $(N-2)^{th}$ dot circuits 2 (dot circuits 2a) switches to a supply state of supplying a driving current to the corresponding one of the light-emitting elements 1a. When the light emission period control signal 1 subsequently switches to level L, each of the first, ..., $(N-2)^{th}$ dot circuits 2 (dot circuits 2a) switches to a shut-off state of not supplying the driving current to the corresponding one of the light-emitting elements 1a.

Similarly, each of the second, ..., $(N-1)^{th}$ dot circuits 2 (dot circuits 2b) switch between the supply state and the shut-off state in response to the switching of level of the light emission period control signal 2 input thereto, and each of the third, ..., $N^{th}$ dot circuits 2 (dot circuits 2c) switches between the supply state and the shut-off state in response to the switching of level of the light emission period control signal 3 input thereto. A circuit configuration of each dot circuit 2 is described in the following.

<Configuration of Dot Circuit>

Figure 6:
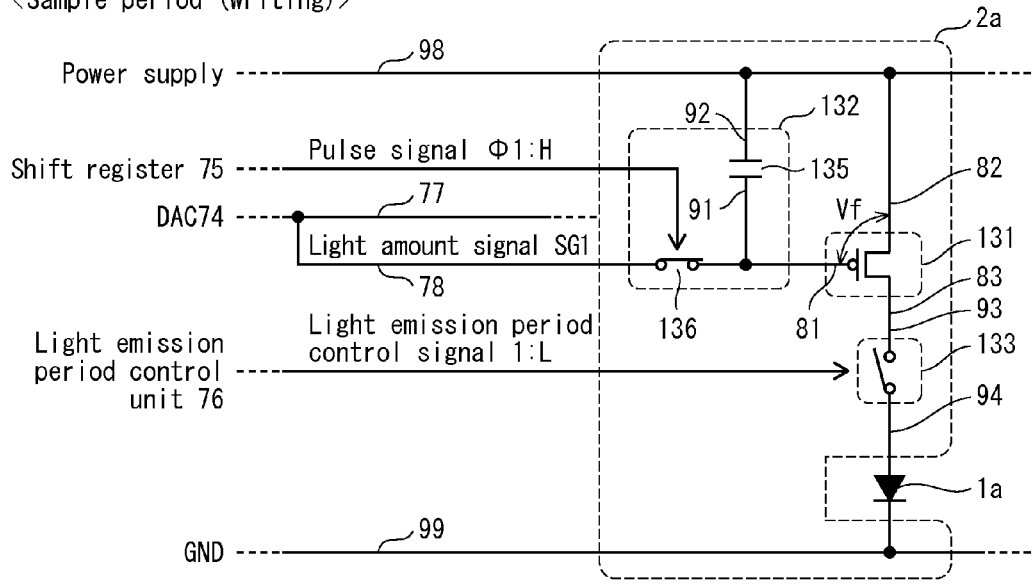
FIG. 6 illustrates a sample period of a light amount signal for one dot circuit.

FIG. 6 illustrates a configuration of one dot circuit, taking the first dot circuit 2 (leftmost dot circuit 2a) as an example. FIG. 6 illustrates the first dot circuit within a sample period of the light amount signal.

As illustrated in FIG. 6, the dot circuit 2a includes a driving circuit 131, an S/H circuit 132, and a switch 133.

The driving circuit 131 is a driving circuit of a voltage input type including a gate terminal 81, an input terminal 82, and an output terminal 83. Here, the driving circuit 131 is a P-type field effect transistor (FET). The input terminal 82 corresponds to a source, and the output terminal 83 corresponds to a drain.

The input terminal 82 of the driving circuit 131 is connected to a power supply wiring 98 connected to a power supply, and the input terminal 82 receives input of a current from the power supply via the power supply wiring 98. The driving circuit 131 outputs a current from the output terminal 83. The current that is output has a level in accordance with a voltage Vf that is a difference between the voltage of the gate terminal 81 and the voltage of the input terminal 82.

The S/H circuit 132 includes a holding element 135 and a switch 136.

The switch 136 is interposed between the gate terminal 81 of the driving circuit 131 and the branch wiring 78 of the signal wiring 77 extending from the DAC 74. The switch 136 is a switch that opens and closes in accordance with the pulse signal ϕ1 from the shift register 75, and is made of, for instance, an FET.

The switch 136 is closed (on) when the pulse signal ϕ1 is level H, and opens (switches off) when the pulse signal ϕ1 switches from level H to level L.

While the switch 136 is on, the gate terminal 81 of the driving circuit 131 and the signal wiring 77 of the DAC 74 are connected. While the switch 136 is off, the gate terminal 81 and the signal wiring 77 are disconnected. In FIG. 6, the gate terminal 81 and the signal wiring 77 are connected.

In this example, the holding element 135 is a capacitor. One terminal 91 of the holding element 135 is connected to the gate terminal 81, and the other terminal 92 of the holding element 135 is connected to the power supply wiring 98.

The input terminal 82 of the driving circuit 131 is connected to the power supply wiring 98. As a result, the terminal 92 of the holding element 105 is connected to the input terminal 82 via a part of the power supply wiring 98.

While the switch 136 is on, the holding element 135 performs holding of the light amount signal SG1, which is input from the branch wiring 78 via the switch 136.

The holding element 135 performs the holding of the light amount signal SG1 by being charged through injection of charge corresponding to the magnitude of the voltage Vf. Such a holding corresponds to charging/discharging of the holding element 135. The voltage Vf is the difference between the voltage of the light amount signal SG1 (corresponding to the voltage applied to the gate terminal 81), which is applied to the terminal 91 of the holding element 135, and the voltage applied to the terminal 92 of the holding element 135 (corresponding to the voltage applied to the input terminal 82 from the power source via the power supply wiring 98).

The injection of charge to the holding element 135 corresponds to the writing of the light amount signal SG1 to the holding element 135, and the time period during which the light amount signal SG1 is written to the holding element 135 is referred to as a sample period of the light amount signal SG1.

As described in the above, a pulse signal ϕ that is input to any dot circuit 2 has the level H only for the predetermined time period Ts. The predetermined time period Ts is equivalent with the amount of time for which the switch 136 is on. Therefore, the predetermined time period Ts is equivalent with the sample period.

One terminal 93 of the switch 133 is connected to the output terminal 83 of the driving circuit 131, and the other terminal 94 of the switch 133 is connected to an anode of the light-emitting element 1a. The switch 133 is a switch that is closed while the light emission period control signal 1 that is output from the light emission period control unit 76 indicates level H, and is open while the light emission period control signal 1 indicates level L. The switch 133 is for instance, an FET. FIG. 6 illustrates one example in which the switch 133 is in an open (off) state. This is because the light emission period control signal 1 indicates level L (off) within the sample period.

A cathode of the light-emitting element 1a is connected to a ground wiring 99. The ground wiring 99 is connected to a ground terminal.

In FIG. 6 (i.e., during the sample period), the switch 133 is off. Because of this, the current from the driving circuit 131 is not supplied to the light-emitting element 1a. Accordingly, the light-emitting element 1a does not emit light.

Figure 7:
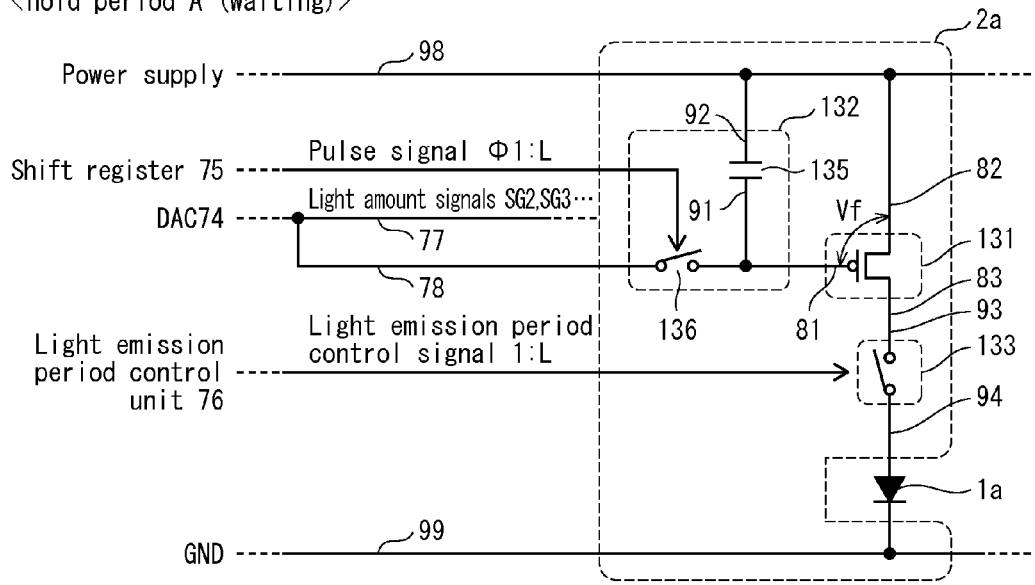
FIG. 7 illustrates a hold period A for one dot circuit.

When the sample period of the first dot circuit 2 ends and the pulse signal ϕ1 switches from level H to level L, the switch 136 turns off as illustrated in FIG. 7.

When the switch 136 turns off, input of the light amount signal SG to the holding element 135 stops. Because of this, the holding element 135 holds the voltage Vf that is generated between both terminals of the holding element 135 within the sample period (FIG. 6), due to the holding element 135 being charged through the writing of the light amount signal SG1. The time period for which both the switch 133 and the switch 136 are off is referred to as a hold period A.

While the first dot circuit 2 is in the hold period A, the second, . . . , $N^{th}$ dot circuits 2 execute holding of the respective light amount signals SG2 through SGN, one after another.

That is, when the sample period of the first dot circuit 2 ends, the sample period for the second dot circuit 2 starts, where the second dot circuit 2 executes holding of the light amount signal SG2. The second, . . . , $N^{th}$ dot circuits 2 execute the holding of a light amount signal one by one.

Each of the dot circuits 2 executes holding of a corresponding light amount signal in the same manner as the first dot circuit executes holding of the light amount signal SG1. That is, when denoting an integer within the range of 1≤N as n, an $n^{th}$ dot circuit 2 executes the following processing only when the pulse signal ϕn input thereto indicates level H (i.e., within a sample period): the switch 136 in the $n^{th}$ dot circuit 2 turns on, and the $n^{th}$ dot circuit 2 executes holding of a light amount signal SGn input thereto by sampling and holding a voltage corresponding to the light amount signal SGn.

Until all dot circuits 2 have executed the holding of light amount signals, the light emission period control signals 1, 2, 3 output by the light emission period control unit 76 each indicate level L.

When a predetermined timing for starting light emission arrives due to all of the dot circuits 2 having executed the holding of light amount signals, each of the light emission period control signals 1, 2, 3 switches from level L to level H. This causes the switch 133 in each of the dot circuits 2 to turn on.

Figure 8:
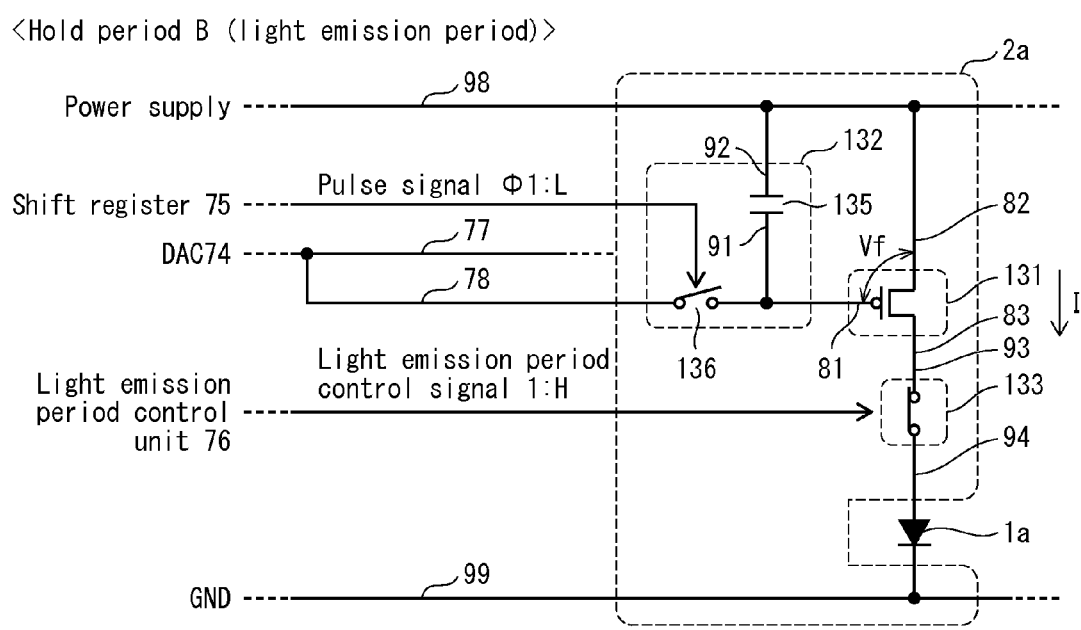
FIG. 8 illustrates a hold period B for one dot circuit.

In FIG. 8, the switch 133 of the first dot circuit 2 is on.

As illustrated in FIG. 8, the driving circuit 131 outputs, from the output terminal 83, a driving current I that is in accordance with the voltage Vf. The voltage Vf is equivalent with a difference in potential between the gate terminal 81 and the input terminal 82, which is generated by the charge that the light amount signal SG1 has caused the holding element 135 to hold in the sample period (FIG. 6).

The driving current I that is output from the output terminal 83 is supplied to the light-emitting element 1a via the switch 133. Then, the driving current I causes the light-emitting element 1a to emit a light beam having a light amount that is in accordance with the voltage value of the light amount signal SG1 (a value of a signal), which is held in the sample period (FIG. 6). Similarly, the second, . . . , $N^{th}$ dot circuits 2 supply driving currents I based on the respective light amount signals SG2 through SGN to the corresponding light-emitting elements 1.

Note that image data includes data of a non-exposure region in which toner images are not to be formed (such as a background part in an original document), and a light amount signal SG corresponding to the non-exposure region is a signal indicating a light emission amount of zero, such as a signal represented by a voltage of 0 V. When a light amount signal indicates a light emission amount of zero, regardless of whether the switches 133 are on or off, the driving circuit 131 does not supply the driving current I to the corresponding light-emitting elements 1, and the light-emitting elements 1 do not emit light.

For each of the dot circuits 2, a time period for which the switch 133 is on is referred to as a hold period B (light emission period). The hold periods B of all light-emitting elements 1 start at the same time point. Meanwhile, the time points at which the hold periods B end are set beforehand so that the hold periods B for the light-emitting elements 1*b* end earlier than the hold periods B for the light-emitting elements 1*a* and the hold periods B for the light-emitting elements 1*c*. That is, a configuration is made such that the light emission period (the hold period B) has a different duration for at least one light-emitting element array. This configuration reduces the dynamic range of the DAC 74 necessary for correction of light amounts.

That is, among the light amount difference along the main scanning direction and the light amount difference along the sub scanning direction described above, the above-mentioned configuration corrects the light amount difference along the sub scanning direction by controlling the duration of light emission periods of the light-emitting elements 1. Thus, the DAC 74 executes only correction of the light amount difference along the main scanning direction. Accordingly, compared to when the DAC 74 executes correction of both the light amount difference along the main scanning direction and the light amount difference along the sub scanning direction, the dynamic range required for correction of light amounts is reduced. The following, by utilizing FIG. 9, describes the above-mentioned configuration where the hold period B has a different duration for at least one light-emitting element array.

<Timing Chart of Sample Period and Hold Periods for Dot Circuits>

FIG. 9 is a timing chart illustrating the sample periods and the hold periods for the dot circuits 2. In FIG. 9, the dot circuits 2 are distinguished from one another by the accompanying numbers 1, 2, 3, 4, . . . , N. For instance, the dot circuit 1 indicates the first dot circuit 2 (leftmost dot circuit 2*a*), and the dot circuit N indicates the $N^{th}$ dot circuit 2 (rightmost dot circuit 2*c*).

The dot circuits 1, 4, . . . , (N−2) each correspond to one of the light-emitting elements 1*a*. Each of the dot circuits 1, 4, . . . , (N−2) receives the light emission period control signal 1. Similarly, the dot circuits 2, 5, . . . , (N−1) each correspond to one of the light-emitting elements 1*b*. Each of the dot circuits 2, 5, . . . , (N−1) receives the light emission period control signal 2. The dot circuits 3, 6, . . . , N each correspond to one of the light-emitting elements 1*c*, and each receive the light emission period control signal 3.

As illustrated in the timing chart in FIG. 9, the light amount signal SG1, which is output while the pulse signal φ1 from the shift register 75 indicates level H, is written to the holding element 135 in the dot circuit 1. Such a writing period of the light amount signal SG1 is the sample period Ts for the dot circuit 1.

After the pulse signal φ1 switches from level H to level L (i.e., when output of the light amount signal SG1 ends), the light amount signal SG2, which is output while the pulse signal φ2 indicates level H, is written to the holding element 135 of the dot circuit 2. Such a writing period of the light amount signal SG2 is the sample period Ts for the dot circuit 2.

Following this, each of the light amount signals SG3, SG4, . . . , SGN is written to the holding element 135 in the corresponding one of the dot circuits 3, 4, . . . , N, one after another.

The hold period A for a given dot circuit is the total of sample periods Ts for the rest of the dot circuits.

A time period Tx (=Ts×N) from a start time t1 of the sample period Ts for the dot circuit 1 to an end time t2 of the sample period Ts for the dot circuit N is a time period required for writing the light amount signals SG1 through SGN to the dot circuits 1 through N.

Within the time period Tx, all of the light emission period control signals 1, 2, 3 indicate level L (OFF), and the switch 133 of each of the dot circuits 1 through N is off. Because of this, all of the light-emitting elements 1, each corresponding to one of the dot circuits 1 through N, are forced not to emit light.

When the time period Tx has elapsed (time point t2), all of the light emission period control signals 1, 2, 3 are switched to level H (ON), and the hold period B starts for all of the dot circuits 1 through N.

Because of this, the switch 133 of each of the dot circuits 1 through N switches on. Thus, in each of the dot circuits 1 through N, the driving current I based on the magnitude of the voltage of the corresponding light amount signal SG (value of a signal), which the holding element 135 has held within the sample period Ts (FIG. 6), is supplied from the driving circuit 131 to the corresponding light-emitting element 1. This causes the corresponding light-emitting element 1 to switch to a state of emitting light with a light amount that is in accordance with the level of the driving current I. The light beam L emitted from each of the light-emitting elements 1 passes through the rod lens array 62 to be collected onto the photoreceptor drum 11.

Control of the hold period B for each of the dot circuits 1 through N, that is, the duration of the light emission period for each of the dot circuits 1 through N, is executed by controlling the duration of the period for which the corresponding one of the light emission period control signals 1, 2, 3 indicates level H (hereinafter referred to as an ON period of a light emission period control signal). In FIG. 9, the light emission period control signals 1 and 3 have ON periods with the same duration Ta, and the light emission period control signal 2 has an ON period with duration Tb, which is shorter than the duration Ta. Accordingly, the light emission periods of the light-emitting elements of the light-emitting element arrays 3*a* and 3*c* have duration Ta, and the light emission period of the light-emitting elements of the light-emitting element array 3*b* has duration Tb, which is shorter than duration Ta.

When the hold period B ends, each of the dot circuits 1 through N returns to the hold period A until time point t3 arrives. This is because when the hold period B ends, the switch 133 switches off, and each of the dot circuits 1 through N returns to the state illustrated in FIG. 7, in which both the switch 133 and the switch 136 are off. The time period from the time point t1 to the time point t3 is determined in advance, and is referred to in the following as a main scanning period (Hsync). The main scanning period has a duration corresponds to the total of the duration of the time period Tx between the time points t1 and t2 and the duration of a time period Ty between the time points t2 and t3. Here, the duration Ta is equal to or shorter than the duration of the time period Ty.

The time period Tx is illustrated to be longer than the time period Ty in FIG. 9. However, actually, the time period Tx is shorter than the time period Ty, and one time period Ty is approximately, for instance, one hundred times longer than one time period Tx.

One main scanning period corresponds to the time period required for forming an electrostatic latent image for one line along the main scanning direction on the photoreceptor drum 11. A main scanning period starts when there is a switch in level of a main scanning signal, whose level switches between level H and level L at predetermined intervals.

Each time a main scanning period (time period between the time points t1 and t3) ends, another main scanning period starts from time point t3. Within each main scanning period, an electrostatic latent image for one line along the main scanning direction is formed on the photoreceptor drum 11. Accordingly, electrostatic latent images corresponding to an image for one page are eventually formed in a direction in which the photoreceptor drum 11 rotates (i.e., sub scanning direction).

In the present embodiment, the plurality of light-emitting elements 1 are arranged to form a zigzag pattern along the main scanning direction instead of being arranged to form a line along the main scanning direction, so as to improve resolution along the main scanning direction.

Therefore, when driving the N light-emitting elements 1 by utilizing image data for pixels forming a single line in the main scanning direction, among the entirety of pixels of the original document image, pixel images formed by the light-emitting elements 1 do not form a single line in the main scanning direction on the rotating photoreceptor drum 11. Instead, the pixel images formed by the light-emitting elements 1 would include pixel images shifted from one another in the sub scanning direction by an amount corresponding to the positional shift between light-emitting elements 1 in the sub scanning direction, which derives from the light-emitting elements 1 being disposed in the zigzag pattern.

In order to prevent the photoreceptor drum 11 from reproducing an image including portions that are shifted in the sub scanning direction, in the present embodiment, the control unit 50 generates image data by correcting the image data of the original document image so that the above-described shift in the sub scanning direction on the photoreceptor drum 11 does not occur. Further, the light amount signal output unit 51 outputs the digital light amount signals based on the image data generated by the control unit 50.

<How Light Amount Difference in Main Scanning Direction and Light Amount Difference in Sub Scanning Direction are Corrected>

Figure 10A:
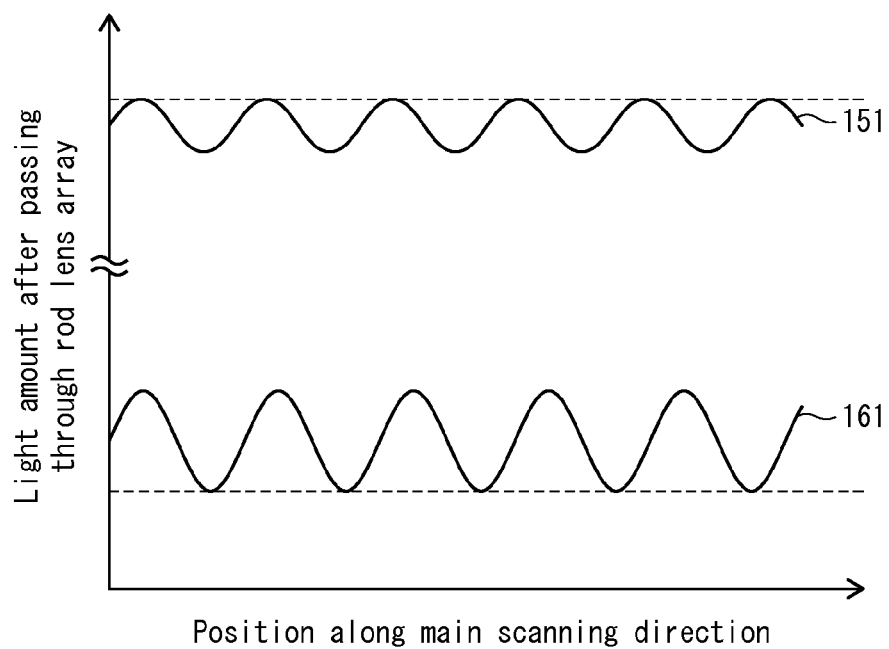
FIG. 10A illustrates graphs exemplifying a light amount difference along the main scanning direction and a light amount difference along the sub scanning direction of light beams having passed through a rod lens array.

FIG. 10A illustrates graphs each corresponding to one of two light-emitting element arrays. Each graph exemplifies the light amount difference along the main scanning direction and the light amount difference along the sub scanning direction for the corresponding light-emitting element array. The horizontal axis indicates positions along the main scanning direction, and the vertical axis indicates light amounts after passing through the rod lens array 62 (hereinafter referred to as "light amount after passing through the lens"). Here, the light amounts after passing through the lens are regarded as being equal to the light amounts received by the photoreceptor drum 11.

Figure 17:
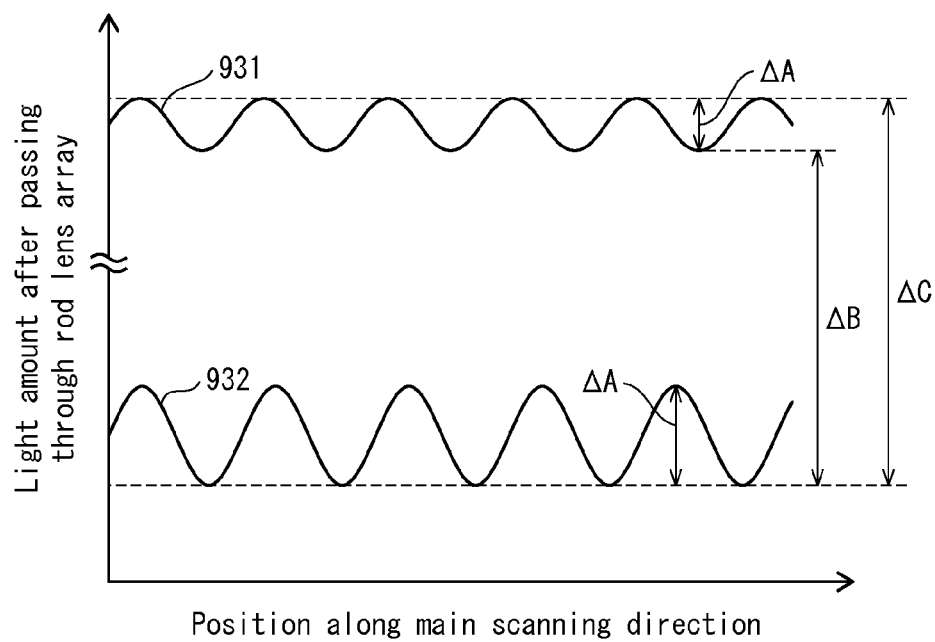
FIG. 17 includes graphs illustrating one example of difference between light amounts of light beams having passed through a rod lens array in the conventional optical head, in a hypothetical case where light beams emitted from all light-emitting elements of two light-emitting element arrays have the same light amount before passing through the rod lens array.

In FIG. 10A, graph 151 illustrated in a solid line corresponds to the light-emitting element array 3b, and graph 161 also illustrated in a solid line corresponds to the light-emitting element array 3a. Each of graphs 151 and 161 supposes that all of the light-emitting elements 1 emit light with the same light amount (i.e., that all light amount signals SG have values indicating the same light amount), and illustrates that the light amount after passing through the lens differs depending upon the position along the main scanning direction. The graphs 151 and 161 correspond to graphs 931 and 932 in FIG. 17, respectively.

In FIG. 10A, graphs 151 and 161 show that the light amount difference along the main scanning direction occurs for each of the light-emitting element arrays 3a, 3b. In specific, the light amounts after passing through the rod lens array 62 indicate a periodical change along the main scanning direction. Graphs 151 and 161 also show that the light amount difference along the sub scanning direction occurs between the light-emitting element arrays 3a and 3b. That is, the light amounts after passing through the rod lens array 62 differ between the light-emitting elements arrays 3a and 3b. The light amount difference along the main scanning direction and the light amount difference along the sub scanning direction result from the light beams L emitted from the light-emitting elements 1 passing through different positions of the rod lens array 62.

The light amount difference along the main scanning direction is a main scanning direction difference in light amounts received by the photoreceptor from one light-emitting element array. The light amount difference along the sub scanning direction is a sub scanning direction difference in light amounts received by the photoreceptor from different light-emitting element arrays.

The light amount difference along the sub scanning direction occurs between different light-emitting element arrays. Therefore, if the light emission period (hold period B) of the light-emitting elements 1a of the light-emitting element array 3a within one main scanning period and the light emission period (hold period B) of the light-emitting elements 1b of the light-emitting element array 3b within one main scanning period were set to have the same duration, the cumulative amount of light that the photoreceptor drum 11 receives from each of the light-emitting elements 1a within one main scanning period differs from the cumulative amount of light that the photoreceptor drum 11 receives from each of the light-emitting element 1b within one main scanning period, even if the light-emitting elements 1a and 1b emit light beam L with the same light amount. This difference between cumulative light amounts within one main scanning period (difference of light exposure amount at different regions of the photoreceptor drum 11) is dependent upon the difference in light amount after passing through the lens differing between the light-emitting elements 1a and the light-emitting elements 1b.

Here, the cumulative light amount that the photoreceptor drum 11 receives from a light-emitting element 1 within one main scanning period (i.e., the a light exposure amount of the photoreceptor drum 11) corresponds to the total amount of light from the light-emitting element 1 to which the photoreceptor drum 11 is exposed within the light-emission period of the light-emitting element 1 in one main scanning period.

Accordingly, in order to eliminate the difference between the cumulative light amount that the photoreceptor drum 11 receives from the light-emitting element array 3a within one main scanning period and the cumulative light amount that the photoreceptor drum 11 receives from the light-emitting element array 3b within one main scanning direction, it suffices to provide the light-emission periods (the hold periods B) for the light-emitting element arrays 3a and 3b with different durations, and thereby cancel out the difference between in light amount after passing through the lens between the light-emitting element arrays 3*a* and 3*b*.

Figure 10B:
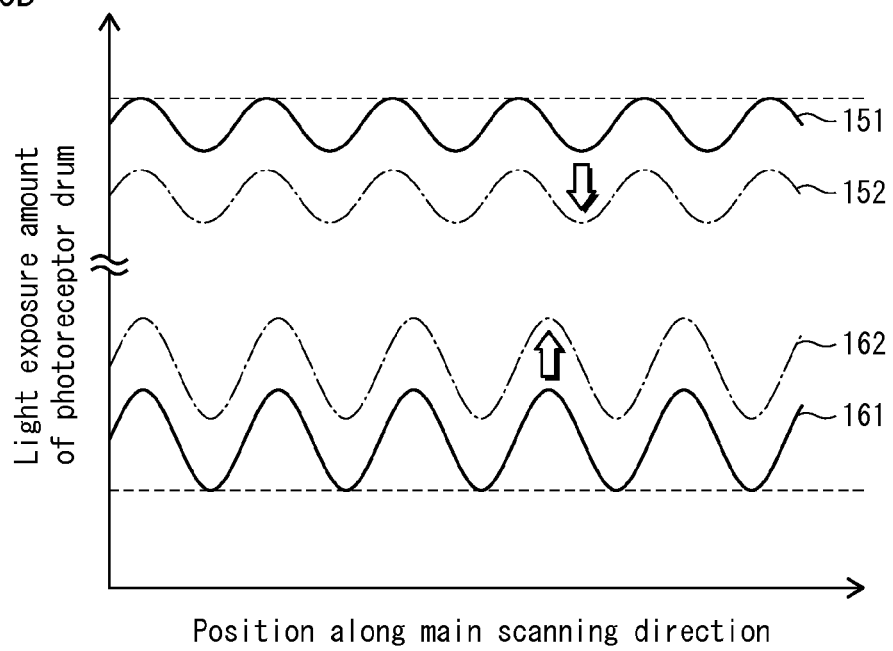
FIG. 10B illustrates graphs exemplifying the light amount difference along the main scanning direction and the light amount difference along the sub scanning direction pertaining to light exposure amount of a photoreceptor.

Specifically, shortening the light emission period of the light-emitting elements of the light-emitting element array 3*b* decreases the cumulative light amount that the photoreceptor drum 11 receives (i.e., the light exposure amount of the photoreceptor drum 11) from the light-emitting element array 3*b* within one main scanning period, as shown by graph 152 illustrated in an alternate long and short dash line of FIG. 10B. Meanwhile, lengthening the light emission period of the light-emitting elements of the light-emitting element array 3*a* increases the cumulative light amount that the photoreceptor drum 11 receives (i.e., the light exposure amount of the photoreceptor drum 11) from the light-emitting element array 3*a* within one main scanning period, as shown by graph 162 illustrated in an alternate long and short dash line of FIG. 10B. That is, by providing the light emission periods for the light-emitting element arrays 3*a* and 3*b* with different durations, the light amount difference along the sub scanning direction between the light-emitting element arrays 3*a* and 3*b* becomes smaller. This means that, within one main scanning period, the difference between the cumulative light amount that the photoreceptor drum 11 receives from the light-emitting element array 3*a* and the cumulative light amount that the photoreceptor drum 11 receives from the light-emitting element array 3*b* decreases.

Therefore, in the present embodiment, in order to eliminate the light amount difference along the sub scanning direction between light-emitting element arrays, the duration of the hold period B (duration for which driving currents are supplied to light-emitting elements 1 included in a light-emitting element array) within one main scanning period is determined beforehand for each of the light-emitting element arrays by experiments and the like. Also, the light emission period control signals 1, 2, 3 indicate level H for the duration determined in advance within each main scanning period.

The timing chart in FIG. 9 illustrates one example in which within one main scanning period, the duration Ta has been set in advance to the predetermined hold period B for each of the light-emitting element arrays 3*a* and 3*c*, and the duration Tb, which is shorter than the duration Ta, has been set to the predetermined hold period B for the light-emitting element array 3*b*.

The duration Tb is shorter than the duration Ta in accordance with the positions of the light-emitting element arrays 3*a*, 3*b*, 3*c* with respect to the rod lens array 62.

Specifically, the light-emitting element array 3*b* is disposed in a position corresponding to the virtual central axis 62*b*. Because of this, the rod lens array 62 lets the light beams L from the light-emitting elements 1*b* of the light-emitting element array 3*b* to pass through at a greater transmittance rate than the light beams L from the light-emitting elements 1*a* of the light-emitting element array 3*a* and the light-emitting elements 1*c* of the light-emitting element array 3*c*.

This means that, when supposing that all of the light-emitting elements 1 emit the same amount of light, among the light-emitting element arrays 3*a*, 3*b*, 3*c*, the average of light amounts that the photoreceptor drum 11 receives from the light-emitting elements in a light-emitting element array is greatest for the light-emitting element array 3*b*. Accordingly, the average of light amounts that the photoreceptor drum 11 receives from the light-emitting elements 1 in each of the light-emitting element arrays 3*a* and 3*c* is smaller than the average of light amounts that the photoreceptor drum 11 receives from the light-emitting elements in the light-emitting element array 3*b*.

This difference in the average light amounts that the photoreceptor drum 11 receives from the light-emitting element arrays brings about the light amount difference along the sub scanning direction between the light-emitting element arrays. Accordingly, setting the light emission duration Tb for the light-emitting element array 3*b* to be shorter than the light emission duration Ta for each of the light-emitting element arrays 3*a* and 3*c* by a time period that is in accordance with the difference in the average light amounts cancels out the difference in the average light amounts and can eliminate the light amount difference along the sub scanning direction.

In addition, the same duration Ta is set to the light emission periods for the light-emitting element arrays 3*a* and 3*c* because of the following reason. In the rod lens array 62 in the present embodiment, lens portions symmetrical about the virtual central axis 62*b* have the same optical characteristics (for instance, transmittance level). Therefore, since the light-emitting element arrays 3*a* and 3*c* are disposed symmetrical about the virtual central axis 62*b*, the light beam L emitted from each light-emitting element 1*a* of the light-emitting element array 3*a* and the light beam L emitted from each light-emitting element 1*c* of the light-emitting element array 3*c*, having the same light amount at the point of light emission, would have the same light amount even after passing through the lens.

The light beams L emitted from the light-emitting element 1*a* and the light beams L emitted from the light-emitting element 1*b* having the same light amount after passing through the lens means that the light amount difference along the sub scanning direction does not exist between the light-emitting elements 1*a* and 1*c*. Accordingly, setting the same duration Ta as the duration of the ON periods of both the light emission period control signals 1 and 3, respectively corresponding to the light-emitting element arrays 3*a* and 3*c*, can eliminate the difference between the cumulative light amount that the photoreceptor drum 11 receives (i.e., the light exposure amount of the photoreceptor drum 11) from the light-emitting element array 3*a* and the cumulative light amount that the photoreceptor drum 11 receives (i.e., the light exposure amount of the photoreceptor drum 11) from the light-emitting element array 3*c* within the duration Ta.

The light emission durations Ta and Tb and the difference between the light emission durations Ta and Tb are to be adjusted so that the light exposure amount of the photoreceptor drum 11 within one main scanning period is sufficient, and further, so that (i) the light amount difference along the sub scanning direction between light-emitting element arrays does not occur, or (ii) even when the light amount difference along the sub scanning direction does occur, the light amount difference along the sub scanning direction does not cause deterioration of a reproduced image. Further, a configuration may be made such that different light-emitting element arrays each perform light emission for a different duration.

Data indicating the light emission periods for the light-emitting element arrays may be stored in the light emission period control unit 76 beforehand. Alternatively, for instance, when a standard duration Tp is determined beforehand and using the standard duration Tp, the duration Ta can be expressed as (Tp+Δp) and the duration Tb can be expressed as (Tp−Δp), Tp and Δp may be stored beforehand and utilized in the control of light emission periods for calculating the durations Ta and Tb. Such a configuration reduces the necessary memory capacity compared to a configuration where a light emission period needs to be stored for each of the light-emitting element arrays 3a, 3b, 3c. Further, this configuration enables calculating the durations Ta and Tb by simply adding or subtracting Δp with respect to the standard duration Tp.

This concludes description of the correction of the light amount difference along the sub scanning direction. The following describes the correction of the light amount difference along the main scanning direction.

Figure 11A:
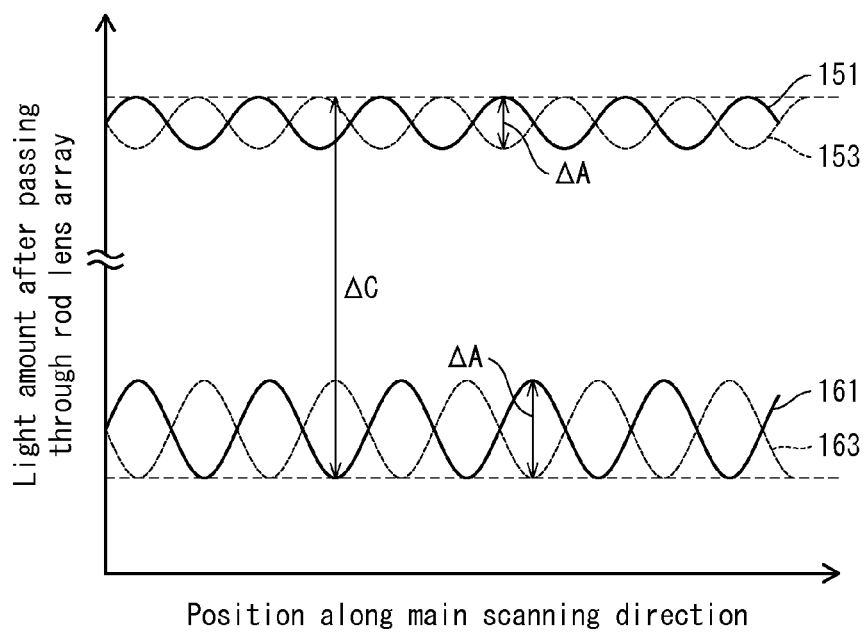
FIG. 11A illustrates graphs illustrated in FIG. 10A, with dotted lines overlaid thereon exemplifying reverse phase waveforms for cancelling out light amount difference of light beams having passed through the rod lens array.

FIG. 11A illustrates the graphs 151, 161 illustrated in FIG. 10, with graphs 153 and 163 (dotted lines) overlaid thereon. The graphs 153 and 163 exemplify reverse phase waveforms for cancelling out of the difference (indicated by ΔA) between light amounts after passing through the lens. The difference ΔA corresponds to the light amount difference along the main scanning direction.

Figure 11B:
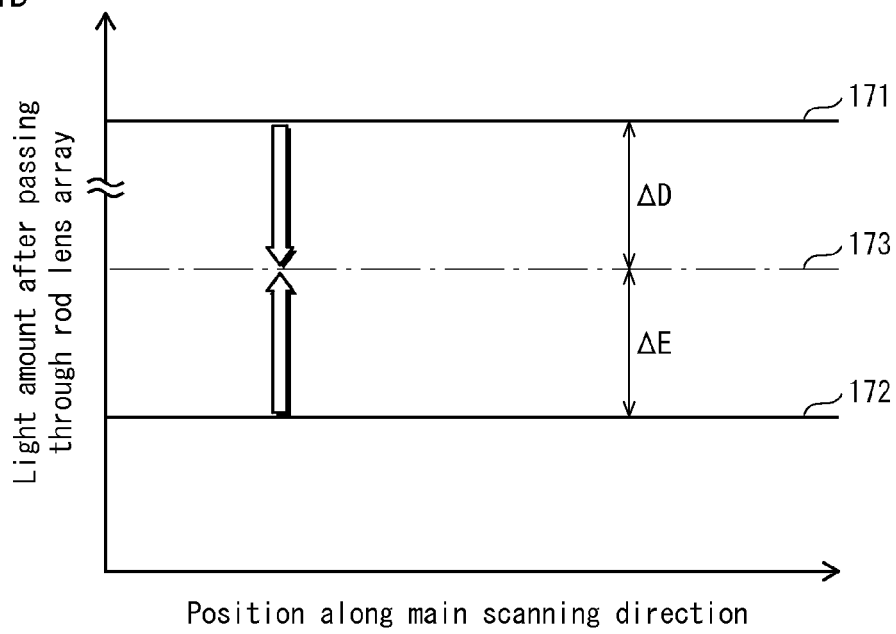
FIG. 11B illustrates examples of graphs illustrating a state after the light amount difference along the main scanning direction and the light amount difference along the sub scanning direction are cancelled out.

FIG. 11B illustrates graph 171, which is one example of a state of the graph 151 after the difference ΔA is canceled out. FIG. 11B also illustrates graph 172, which is one example of a state of the graph 161 after the difference ΔA is canceled out. Each of graphs 171 and 172 is linear. The graphs 171 and 172 respectively indicate that for the light-emitting element arrays 3b and 3a, light after passing through the lens has the same light amount at all positions along the main scanning direction.

That is, the difference ΔA for a given light-emitting element array can be cancelled out and the light amount difference along the main scanning direction for the light-emitting element array can be eliminated by correcting the light amounts (values between 1 and 256) indicated by the light amount signals for the light-emitting elements belonging to the light-emitting element array based on a specific function formula. The specific function formula is that indicating the reverse of the phase of the light amount difference along the main scanning direction occurring with respect to the given light-emitting element array. The graph 153 in FIG. 11B corresponds to the specific function formula for the light-emitting element array 3b, and the graph 163 in FIG. 11B corresponds to the specific function formula for the light-emitting element array 3a.

For each of the light-emitting element arrays, the characteristic of the light amount difference along the main scanning direction can be determined beforehand by experiments and the like. Thus, for each of the light-emitting element arrays, a specific function formula for canceling out the light amount difference along the main scanning direction can be determined beforehand.

Such function formulas are stored in the correction unit 741 included in the DAC 74. In the actual execution of printing, the correction unit 741 first receives digital light amount signals from the light amount signal output unit 51. Then, the correction unit 741, with respect to each light-emitting element array, corrects the light emission amounts (values between 1 and 256) for the light-emitting elements 1 of the light-emitting element array based on a function formula corresponding to the light-emitting element array.

The DAC 74 converts the digital light amount signals having been corrected by the correction unit 741 to analog signals each indicating a voltage. The light amount signals SG1, SG2, ..., SGN illustrated in the above figures are the analog signals that the DAC 74 generates from the digital light amount signals having been corrected by the correction unit 741. Note that a configuration may be made such that instead of function formulas, for instance, a conversion table associating light emission amounts of light amount signals before correction and light emission amounts of light amount signals after correction is utilized.

The correction of the light amount signals described above is executed solely to eliminate the light amount difference along the main scanning direction. Because of this, the dynamic range required for executing correction can be as small as, for instance, ΔA illustrated in FIG. 11A.

In contrast, in conventional technology that suppresses both the light amount difference along the main scanning direction and the light amount difference along the sub scanning direction by correcting light amount signals, the dynamic range required for executing correction needs to be as large as, for instance, ΔC illustrated in FIG. 11A.

As described above, a greater dynamic range results in a necessity for providing a greater number of bits to the light amount signals. Because of this, the number of elements such as a logic gate for executing processing such as D/A conversion of the light amount signals increases, and the correction circuit is enlarged.

In the present embodiment, the dynamic range is smaller than the dynamic range utilized in conventional technology. This enables the correction circuit of the correction unit 741 to be relatively small, and the source IC 73 that incorporates the correction unit 741 to be provided at a low cost.

Due to the correction unit 741 correcting the light amount signals as described above, the light amount difference along the main scanning direction can be eliminated for each of the light-emitting element arrays 3b and 3a (as respectively illustrated in graphs 171, 172 in FIG. 11B). Further, the adjustment of light emission durations by the light emission period control unit 76 lengthens the light emission period for the light-emitting element array 3a by an amount of time corresponding to ΔE in FIG. 11B, and shortens the light emission period for the light-emitting element array 3b by an amount of time corresponding to AD in FIG. 11B. This can eliminate the light amount difference along the sub scanning direction between the light-emitting element arrays 3a and 3b. Graph 173 in FIG. 11B illustrates that providing the light emission periods of the light-emitting element arrays 3a and 3b with different durations results in the photoreceptor drum 11 receiving the same cumulative light amount from the light-emitting element arrays 3a and 3b within one main scanning period.

Similarly, with respect to the light-emitting element array 3c, both the light amount difference along the main scanning direction of the light-emitting element array 3c and the light amount difference along the sub scanning direction between the light-emitting element array 3c and other light-emitting element arrays (i.e., the light-emitting element arrays 3a,3b) can be eliminated by applying the same method as described above.

Note that the light emission duration (the amount of time for which the driving current I is supplied) within one main scanning period for each of the light-emitting element arrays is set beforehand so as to suit device configuration, by experiments and the like.

For instance, the light emission duration may be varied between the light-emitting element arrays as follows. Note that the following light emission durations do not take into consideration the correction of the light amount difference along the main scanning direction performed by the correction unit 741. That is, the light emission durations may be varied such that (i) a difference (indicated by ΔF in FIG. 12) between the maximum and the minimum of cumulative light amounts of light having passed through the lens that the photoreceptor drum 11 receives from the light-emitting element array 3a (indicated by graph 161 in FIG. 12) is greater than a difference (indicated by ΔG in FIG. 12) between the maximum and the minimum of cumulative light amounts of light having passed through the lens that the photoreceptor drum 11 receives from the light-emitting element array 3b (indicated by graph 151 in FIG. 12), and further (ii) a range defined by the maximum and the minimum of cumulative light amounts of light having passed through the lens that the photoreceptor drum 11 receives from the light-emitting element array 3a includes the maximum and the minimum of cumulative light amounts of light having passed through the lens that the photoreceptor drum 11 receives from the light-emitting element array 3b.

Providing the light-emitting element arrays 3a and 3b with different light emission durations in such a manner reduces the dynamic range required for correcting light amount signals to a further extent. This is since configuring the light amount signals to indicate a range of values defined by a maximum value and a minimum value differing by the difference ΔF enables correcting the light amount difference along the main scanning direction for both the light-emitting element arrays 3a and 3b Meanwhile, when the maximum (the minimum) of the cumulative light amounts of light having passed through the lens that the photoreceptor drum 11 receives from the light-emitting element array 3b exceeds (falls below) the maximum (the minimum) of a range of cumulative light amounts of light having passed through the lens that the photoreceptor drum 11 receives from the light-emitting element array 3a by a certain amount, the range of difference between the maximum and the minimum of cumulative light amounts of light having passed through the lens increases by the same amount. Due to this, unfortunately, the light amount signals need to be capable of indicating a range of values that is greater by the certain amount (i.e., a greater dynamic range is required).

In addition, the light emission durations of the light-emitting element arrays may be varied such that a cumulative light amount range of a light-emitting element array in which the difference between the maximum and the minimum of cumulative light amounts is greatest includes all cumulative light amount ranges of the rest of the light-emitting element arrays.

Figure 12:
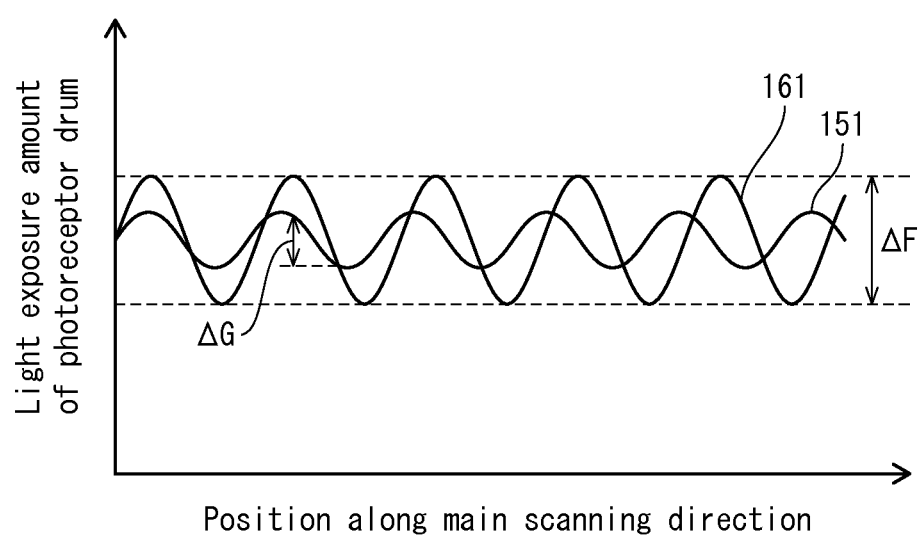
FIG. 12 illustrates one example in which a difference ΔF between light amounts of light beams from different light-emitting elements of one light emitting element array, after having passed through the rod lens array, includes a difference ΔG of light amounts from different light-emitting elements of another light-emitting element array, after having passed through the rod lens array.

It goes without saying that FIG. 12 merely illustrates one example of how light emission durations for light-emitting element arrays may be varied. That is, the light emission durations for the light-emitting element arrays are to be set as appropriate based on the permissible dynamic range.

As described above, in the present embodiment, among the light amount difference along the main scanning direction and the light amount difference along the sub scanning direction, the light amount difference along the sub scanning direction is corrected by varying the light emission duration (duration for which the driving current I is supplied) between the light-emitting element arrays. Accordingly, the correction of light amount signal values needs to be executed only for the light amount difference along the main scanning direction.

Accordingly, compared to a configuration in which correction of light amount signal values is executed to correct both the light amount difference along the main scanning direction and the light amount difference along the sub scanning direction, the present embodiment reduces the dynamic range required for the correction of light amount signal values. Accordingly, the scale of the correction circuit of the correction unit 741 can be reduced and the cost of the source IC 73 can be reduced, while maintaining accuracy of correction.

In addition, in the present embodiment, the driving current I is not supplied to any of the light-emitting elements 1 within the sample periods. This suppresses the difference in the amount of light emitted by the light-emitting elements 1, even when a voltage drop occurs in the power supply wiring 98.

That is, in a configuration where within a sample period of a given dot circuit 2, the driving current I is supplied to other dot circuits 2, the resistance of the power supply wiring 98 causes the voltage of the power supply wiring 98 to drop in the longitudinal direction of the power supply wiring 98. This results in voltage input from the power supply wiring 98 to a dot circuit 2 arranged at a long wiring distance from the power supply becoming lower than voltage input to a dot circuit 2 arranged at a short wiring distance from the power supply. The difference between the voltages input to such dot circuits 2 corresponds to the magnitude of voltage drop occurring, which depends upon the different lengths of wiring leading to such dot circuits 2.

When such a voltage drop occurs, even when the light amount signals SG input to dot circuits 2 have the same voltage, a difference occurs in the voltage input from the power supply wiring 98 to the holding elements 135 of the dot circuits 2. As a result, the sampled voltage Vf differs between different ones of the dot circuits 2. This is because the voltage Vf in a dot circuit 2 determines the amount of the driving current I supplied to the corresponding light-emitting element 1. Therefore, even when the light amount signals SG input to dot circuits 2 indicate the same light amount, a difference in the voltage Vf between the dot circuits 2 results in the corresponding light-emitting elements 1 receiving driving currents I differing from one another by the difference in the voltage Vf. Such a difference is likely to result in light-emitting elements 1 emitting different amounts of light.

Meanwhile, in the present embodiment, the driving current I is not supplied to any of the light-emitting elements 1 within the sample periods. This reduces the voltage drop occurring in the power supply wiring 98, and reduces the difference in the voltage Vf between dot circuits 2. Accordingly, the present embodiment reduces the risk of light-emitting elements 1 emitting different amounts of light.

The present invention should not be construed to be limited to an optical writing device and an image forming device. For instance, the present invention may be a correction method that is utilized in an optical writing device writing an image by utilizing light onto an image carrier such as a photoreceptor, and that (i) corrects the light amount difference along the main scanning direction with respect to each light-emitting element array by changing the driving currents supplied to different ones of light-emitting elements of the light-emitting element array, and (ii) corrects the light amount difference along the sub scanning direction by varying the light emission duration between different light-emitting element arrays.

Further, the present invention may be a computer program that realizes the above method by utilizing a computer. In addition, the program pertaining to the present invention may be recorded onto, for instance, a magnetic tape, a magnetic disk such as a flexible disk, an optical recording medium such as a DVD-ROM, a DVD-RAM, a CD-ROM, a CD-R, an MO, or a PD, or any type of a computer-readable recording medium. The present invention may be produced and distributed, etc., in the form of the above recording medium, or may be transmitted and supplied in the form of the computer program via, for instance, a wireless or wired network including the Internet, broadcasting, an electrical communication line, or satellite communication.

(Modifications)

Up to this point, description has been provided based on one embodiment of the present invention. However, the present invention should not be construed as being limited to the embodiment. That is, modifications such as those described in the following should be construed as being within the spirit and scope of the present invention.

(1) In the embodiment, the light emission period for the light-emitting element array 3a is provided with the duration Ta by using the light emission period control signal 1, the light emission period for the light-emitting element array 3b is provided with duration Tb by using the light emission period control signal 2, and the light emission period for the light-emitting element array 3c is provided with duration Ta by using the light emission period control signal 3. However, the duration of a light emission period of a light-emitting element array need not be controlled by using a light emission period control signal, as long as the light amount difference along the sub scanning direction, which derives from the optical characteristic of the rod lens array 62, can be eliminated. For example, a modification may be made of setting the duration Ta of the light emission periods for the light-emitting element arrays 3a and 3c as a standard duration, and providing the light emission period for the light-emitting element array 3b with a duration Tb shorter than the duration Ta.

Figure 13:
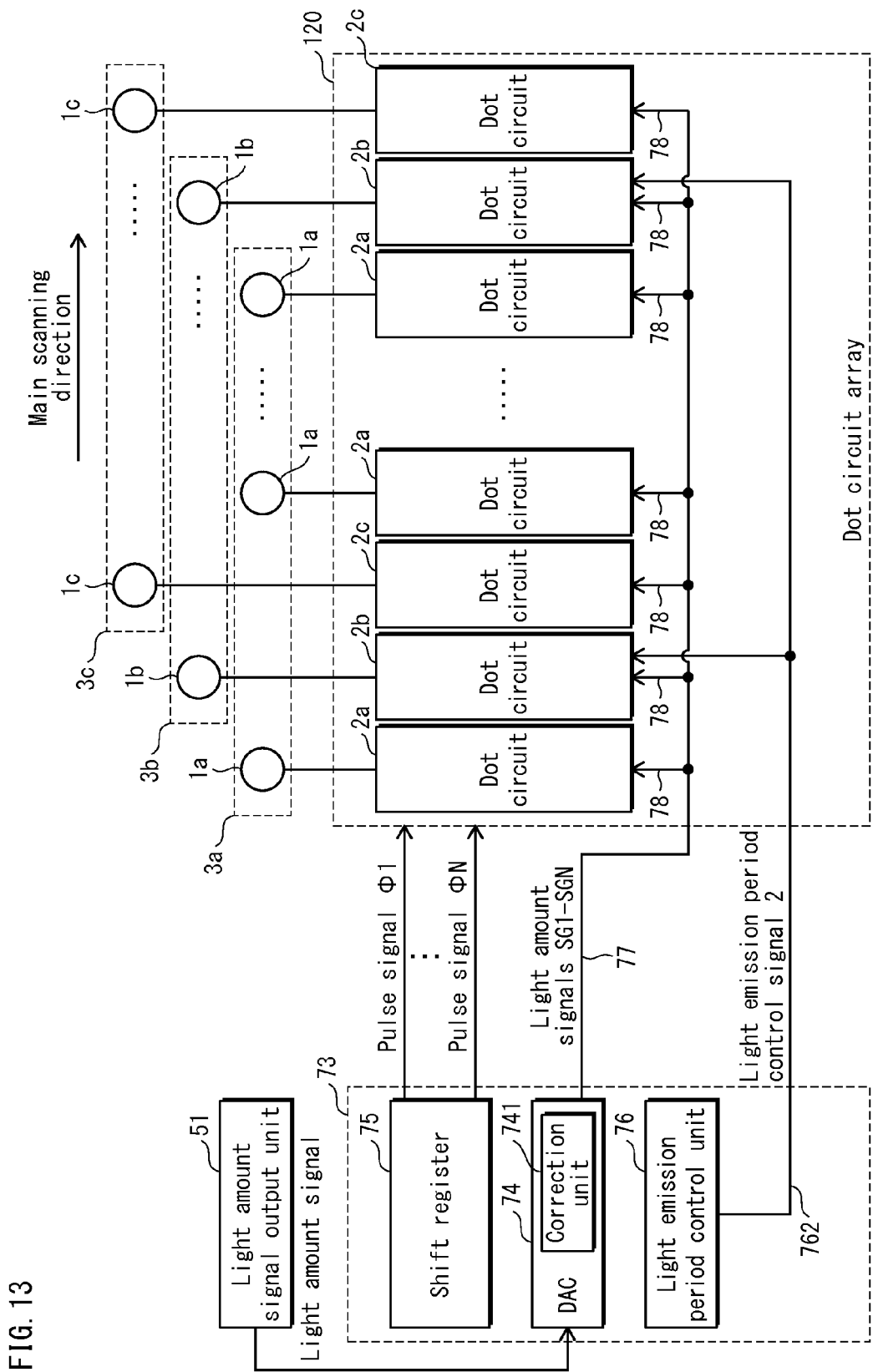
FIG. 13 illustrates a modification in which light-emission time control signals are input only to dot circuits corresponding to light-emitting elements of one light-emitting element array.

FIG. 13 illustrates a configuration pertaining to this modification, where a light emission period control signal (i.e., the light emission period control signal 2) is input to only the dot circuits 2b, which correspond to the light-emitting elements 1b.

The configuration in FIG. 13 is similar to that described in the embodiment in that the light emission period control signal 2 is input to the dot circuits 2b. However, the configuration of FIG. 13 differs from that described in the embodiment in that the light emission period control signals 1 and 3 are not input to the dot circuits 2a and 2c, respectively.

Figure 14:
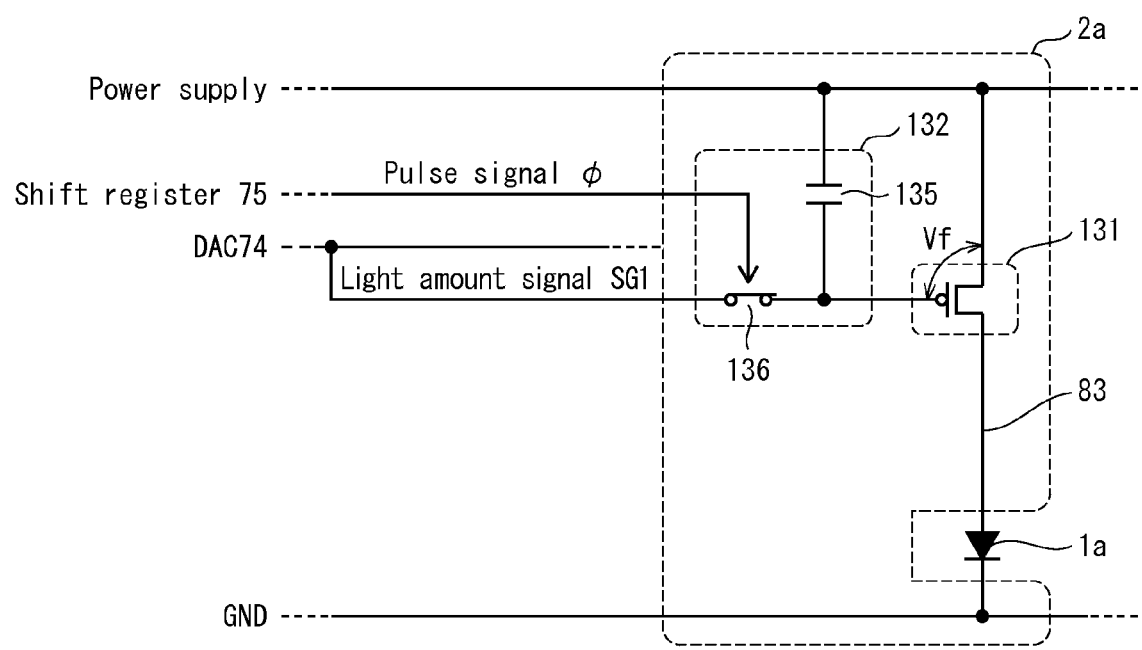
FIG. 14 illustrates a configuration of a dot circuit pertaining to the modification.

FIG. 14 illustrates a modified configuration of a dot circuit 2a pertaining to this modification. In the dot circuit 2a illustrated in FIG. 14, a short circuit is formed by the output terminal 83 of the driving circuit 131 and the anode of the light-emitting element 1a. Due to this, the driving circuit 131 supplies, to the light-emitting element 1a, a driving circuit I that is in accordance with the voltage Vf between both terminals of the holding element 135 within the entirety of each main scanning period, irrespective of whether the dot circuit 2a is in a sample period or a hold period. Note that in this modification, the dot circuits 2c have the same circuit configurations as the dot circuits 2a.

In the following, the method of driving a dot circuit so that the dot circuit supplies driving current to a corresponding light-emitting element 1, irrespective of whether the dot circuit is in a sample period or a hold period, is referred to as "rolling drive" of the dot circuit.

Figure 15:
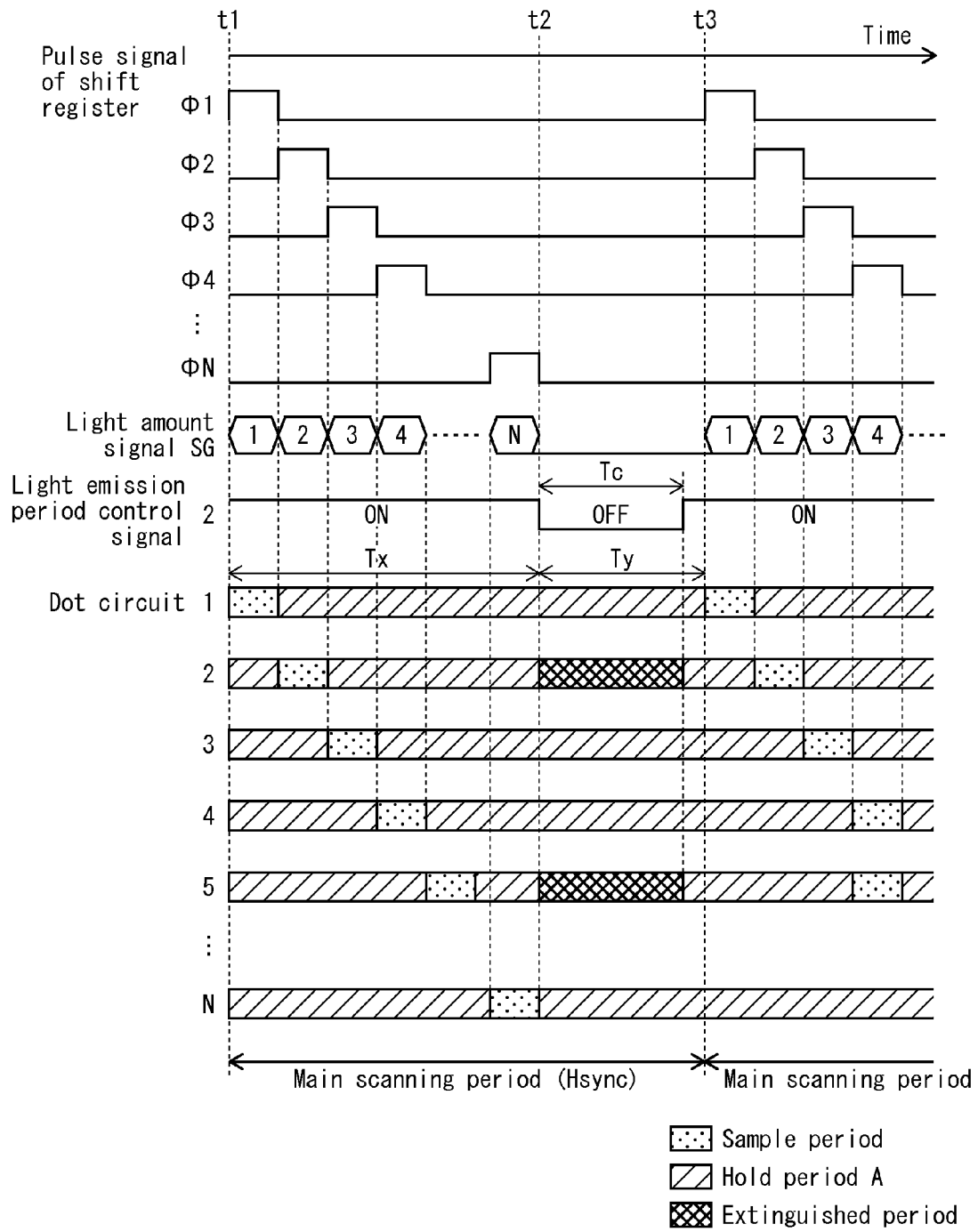
FIG. 15 is a timing chart of rolling drive related to the circuit configuration pertaining to the modification.
Figure 16:
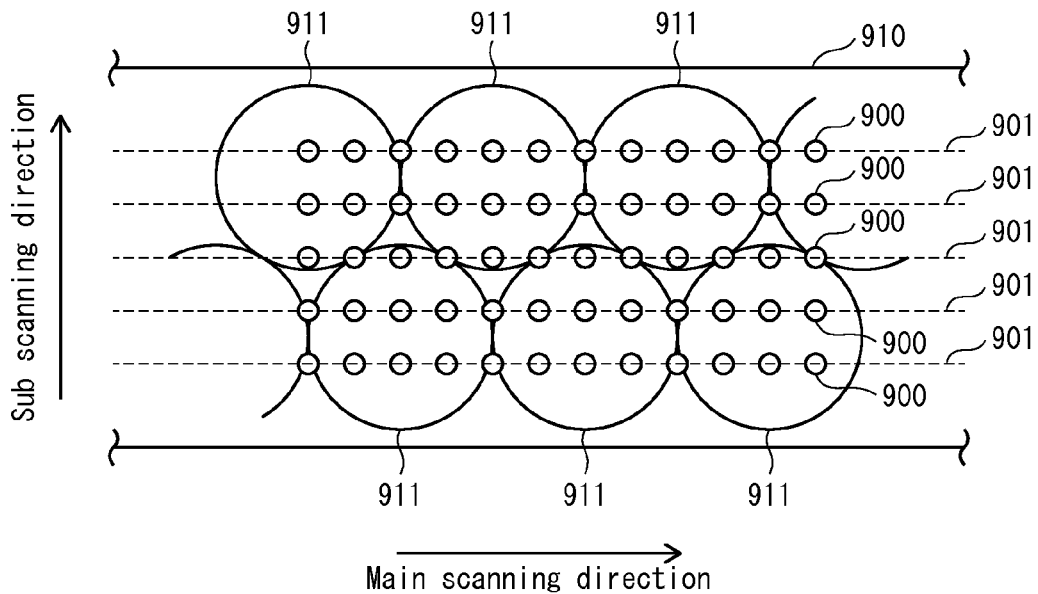
FIG. 16 is a schematic planar view illustrating positions of light-emitting elements relative to a rod lens array in a conventional optical head.

FIG. 15 is a timing chart related to rolling drive of dot circuits with the modified configuration pertaining to the modification.

As illustrated in FIG. 15, a main scanning period for each dot circuit 2a (i.e., the first, fourth, . . . , N−2th dot circuits 2) is composed of only a sample period and a hold period A. When in the hold period, each dot circuit 2a is in the state illustrated in FIG. 8 due to not including the switch 133. This similarly applies to each dot circuit 2c (third, sixth, . . . , Nth dot circuits 2).

Thus, when taking the first dot circuit 2 for example, when the voltage Vf held during a given sample period is large enough for light emission, the first dot circuit 2 supplies a driving current I in accordance with the voltage Vf to the light-emitting element 1a corresponding to the first dot circuit 2 until the subsequent sample period arrives. This similarly applies to the rest of the dot circuits 2a and the dot circuits 2c.

Meanwhile, each dot circuit 2b (i.e., the second, fifth, . . . , N−1th dot circuits 2) includes the switch 133, similar to the dot circuits 2b in the embodiment. Thus, the light emission period of each dot circuits 2b is controlled by using the switch 133.

In FIG. 15, the light emission period control signals indicate level L (OFF) only for the time period Tc starting from time point t2, within one main scanning period. Since the switch 133 is OFF during the time period Tc, each dot circuit 2b does not supply driving current I to the corresponding light-emitting element 1b, and thus, the light-emitting element 1b does not perform light emission.

Thus, the light emission period for the light-emitting element array 3a and the light emission period for the light-emitting element array 3c have the same duration Ta (standard duration), whereas the light emission period for the light-emitting element array 3b has a duration Tb shorter than the standard duration.

In this modification, the input of the light emission period control signal 1 to the dot circuits 2a and the input of the light emission period control signal 3 to the dot circuits 2c become unnecessary, which means that the generation of the light emission period control signals 1 and 3 is no longer necessary. This simplifies the circuit configuration of the light emission period control unit 76, and makes no longer necessary the signal wiring 761 connecting the light emission period control unit 76 with the dot circuits 2a and the signal wiring 763 connecting the light emission period control unit 76 with the dot circuits 2c. Accordingly, the modification reduces the number of wiring patterns and consequently reduces panel size.

In addition, when the light-emitting elements 1 are implemented by using OLEDs, there is a risk of the light emission efficiency of a light-emitting element 1 decreasing as the total light emission time of the light-emitting element 1 increases. This is due to the light emission amount of OLEDs decreasing with the increase in total light emission time. In view of this, the present modification moderates the rate at which the total light emission time of each light-emitting element 1b increases, compared to the rate at which the total light emission time increases for light-emitting elements with respect to which rolling drive is performed. The moderation of the rate at which the total light emission time of each light-emitting element 1b increases is achieved by causing the light-emitting elements 1b to perform light emission for a shorter duration than other light-emitting elements. This prevents the light emission efficiency of the light-emitting elements 1b from decreasing, and thus suppresses a decrease in light emission amount of the light-emitting elements 1b.

(2) In the embodiment, the light emission period control signals 1 and 3 indicate the ON periods with the same duration Ta as illustrated in FIG. 9, and further, the ON periods indicated by the light emission period control signals 1 and 3 start at the same time point (i.e., the light emission period control signals 1 and 3 switch to level H at the same time point). Thus, the light emission period control signals 1 and 3 have the same waveform.

When the light emission period control signals 1 and 3 have the same waveform as described above, a modification may be made of providing a signal wiring that serves as both the signal line 761 and the signal wiring 763. This modification reduces the number of wiring patterns on the TFT substrate 71 and reduces the size of the OLED panel 61 compared to when providing the signal line 761 and the signal wiring 763 separately. Further, the signal wirings 761 and 763 may be provided separately or may be substituted by a signal wiring serving as both the signals wirings 761 and 763 depending upon the structure of the OLED panel 61.

Further, considering that it suffices for the light emission period control signals 1 and 3 to indicate ON periods with the same duration, the ON periods indicated by the light emission period control signals 1 and 3 need not be in complete synchronization. That is, for example, the ON period indicated by the light emission period control signal 1 and the ON period indicated by the light emission period control signal 3 may start at different time points. In this case, it is necessary that the signal wirings 761 and 763 be provided separately. Similarly, when the light emission period control signals 1 through 3 indicate different ON periods, it is necessary that signal wirings each corresponding to one of the light emission period control signals 1 through 3 be provided.

(3) In the embodiment, each holding element 135 is implemented by using a capacitor. However, the holding elements 135 need not be implemented by using capacitors, as long as the holding elements 135 are capable of holding signal values indicating light emission amounts (light amount signals) written thereto.

Further, in the embodiment, the light-emitting elements 1 are implemented by using current-driven OLEDs whose light emission amount changes depending upon the current amount (level of current) flowing therethrough. However, the light-emitting elements 1 may be implemented by using light-emitting elements of other types, such as LEDs.

Further, in the embodiment, description is provided of an example where the light-emitting elements 1 form a zigzag pattern along the main scanning direction. However, the light-emitting elements 1 need not be arranged in a zigzag pattern, and the present invention is applicable to any light emitting unit including light emitting elements arranged two-dimensionally to form a plurality of light-emitting element arrays arranged in the sub-scanning direction and each composed of two or more light-emitting elements arranged in line in the main scanning direction.

Further, in order to eliminate the light amount difference along the main scanning direction caused by the optical characteristic of the rod lens array 62 (the difference in light amounts received by the photoreceptor drum 11 from each light-emitting element array), a modification may be made of providing, to each of the light-emitting element arrays 3a through 3c, a correction unit that corrects the values of the light amount signals supplied to the light-emitting elements 1 included in the corresponding light-emitting element array.

Further, in order to correct the light amount difference along the sub scanning direction (the difference between cumulative light amounts received by the photoreceptor drum 11 from different light-emitting element arrays within one main scanning period), a modification may be made of providing a control unit that performs a control of causing at least two light-emitting element arrays to perform light emission for a different duration within one main scanning period.

Further, in the embodiment, description is provided of an example where the driving circuits 131 are implemented by using field effect transistors (FETs). However, the driving circuits 131 may be implemented by using voltage-driven circuits other than FETS, as long as the driving circuits 131 supplies, to a corresponding light-emitting element 1, a driving current I that is in accordance with a value of a signal indicating the light emission amount of the corresponding light-emitting element 1. Further, the number, the size, and the arrangement of the light-emitting elements 1, the number of the light-emitting element arrays formed by the light-emitting elements 1, the circuit configurations and the circuit elements included in the dot circuits, and the relationship between levels of different voltages described above are mere examples not limiting the present invention in any way.

(4) In the embodiment, a single TFT substrate 71 has formed thereon the light-emitting elements 1, the driving circuits 131, and the switches 133. Each driving circuit 131 is a thin film transistor (TFT), and similarly, each switch 133 is a TFT. However, the present invention is applicable to other circuits having other structures.

(5) In the embodiment, the optical writing device pertaining to the present invention is implemented by using the printer 5. However, other applications of the present invention are also possible. For example, the present invention is applicable to optical writing devices used in image forming devices such as copiers and MFPs that have photoreceptors receiving optical writing of electrostatic images or the like, such as the photoreceptor drum 11. Further, the present invention is applicable to an optical writing device that performs writing to a photoreceptor by using light, in any device. That is, the optical writing device pertaining to the present invention need not be implemented in an image forming device.

In the embodiment, description is provided of an example where the rod lens array 62 is used as an optical lens collecting light from a light-emission element and allowing the collected light to radiate the photoreceptor. However, the present invention is not limited to this, and is applicable to optical lenses of other types, such as a microlens array. In addition, it should be noted that the light amount difference along the main scanning direction and the light amount difference along the sub scanning direction are not necessarily caused by the optical lens. That is, irrespective of whether or not an optical lens is present, the present invention is capable of suppressing the light amount difference along the main scanning direction and the light amount difference along the sub scanning direction while simplifying the circuit configuration of the correction unit.

Further, any possible combination of the embodiment and the modifications is included within the spirit and the scope of the present invention.

CONCLUSION

The above embodiment and modifications each show one aspect of the present invention, which solves the technical problem described in the RELATED ART section of the present disclosure. The following summarizes various aspects of the present invention.

One aspect of the present invention is an optical writing device including a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to a photoreceptor by utilizing light emitted from light-emitting elements. The optical writing device includes: a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array; a driving unit that supplies driving currents to the respective light-emitting elements, the driving currents being based on the corrected signal values; and a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

The optical writing device pertaining to one aspect of the present invention may further include an optical lens, and the optical lens may have a plurality of regions each collecting light from one of the light-emitting elements and expose the photoreceptor to the collected light, and the control unit may set the different durations in accordance with positions of the at least two element arrays with respect to the optical lens.

In the optical writing device pertaining to one aspect of the present invention, the driving unit may include a plurality of circuits each corresponding to one of the light-emitting elements and each supplying a driving current to the corresponding light-emitting element, the control unit may include a light emission period control unit transmitting light emission period control signals to the respective circuits, a circuit receiving a light emission period control signal switching between a supply state of supplying a driving current to the corresponding light-emitting element and a non-supply state of not supplying a driving current to the corresponding light-emitting element, the element arrays may include a first element array and a second element array that are disposed symmetrically about a virtual central axis of the optical lens, the virtual central axis parallel to the main scanning direction and passing through a center of the optical lens in the sub scanning direction, and light emission period control signals transmitted to ones of the circuits corresponding to light-emitting elements of the first element array and light emission period control signals transmitted to ones of the circuits corresponding to light-emitting elements of the second element array may cause the first element array and the second element array to perform light emission for a same duration within one main scanning period.

In the optical writing device pertaining to one aspect of the present invention, light emission period control signals may be transmitted to ones of the circuits corresponding to light-emitting elements in an element array via a signal wiring corresponding to the element array, and light emission period control signals for the first element array and the second element array may be transmitted via the same signal wiring.

In the optical writing device pertaining to one aspect of the present invention, the optical lens may be a rod lens array or a microlens array.

In the optical writing device pertaining to one aspect of the present invention, the at least two element arrays may include a third element array and a fourth element array such that, when the signal values indicate a same light amount, a difference between the maximum and minimum of light amounts received by the photoreceptor from light-emitting elements of the third element array is greater than a difference between the maximum and minimum of light amounts received by the photoreceptor from light-emitting elements of the fourth element array, and the third and fourth element arrays may be caused to perform light emission for different durations within one main scanning period such that, when the signal values indicate a same light amount and without the correction by the correction unit, a range defined by the maximum and minimum of cumulative light amounts received, within one main scanning period, by the photoreceptor from the light-emitting elements of the third element array includes the maximum and minimum of cumulative light amounts received, within one main scanning period, by the photoreceptor from the light-emitting elements of the fourth element array.

In the optical writing device pertaining to one aspect of the present invention, the element arrays may be composed of a fifth element array from which the photoreceptor receives a greatest average light amount when the signal values indicate a same light amount, and one or more sixth element arrays being the rest of the element arrays, the control unit may cause the fifth light-emitting element array to perform light emission for a shorter duration than the sixth light-emitting element arrays within one main scanning period.

In the optical writing device pertaining to one aspect of the present invention, the control unit may use a duration for which the sixth element arrays perform light emission within one main scanning period as a standard duration, and the control unit may execute the control with respect to only the fifth light-emitting element array and cause the fifth light-emitting element array to perform light emission for a duration shorter than the standard duration.

In the optical writing device pertaining to one aspect of the present invention, the light-emitting elements may be organic light emitting diodes.

One aspect of the present invention is an image forming device including: a photoreceptor; and an optical writing device that executes writing of an image onto the photoreceptor by utilizing light. In the image forming device, the optical writing device includes a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to the photoreceptor by utilizing light emitted from light-emitting elements, and the optical writing device includes: a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array; a driving unit that supplies driving currents to the respective light-emitting elements, the driving currents being based on the corrected signal values; and a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

As described above, among the light amount difference along the main scanning direction (i.e., the difference between light amounts received by the photoreceptor from different light-emitting elements included in a light-emitting element array) and the light amount difference along the sub scanning direction (i.e., the difference between cumulative light amounts received by the photoreceptor from different light-emitting element arrays within one main scanning period), the light amount difference in the sub scanning direction is corrected by causing light-emitting element arrays to perform light-emission for different durations within one main scanning period. Thus, the correction of values of signals indicating light emission amounts is executed only for correcting the light amount difference in the main scanning direction.

Accordingly, compared to a configuration that executes the correction of values of signals indicating light emission amounts for correcting both the light amount difference along the main scanning direction and the light amount difference along the sub scanning direction, the above-described structure achieves a smaller dynamic range for executing the correction. This further achieves a reduction in the size of the correction circuit of the correction unit and a reduction in cost of semiconductor elements such as an IC that includes the correction circuit therein.

Although the present invention is fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical writing device including a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to a photoreceptor by utilizing light emitted from the light-emitting elements, the optical writing device comprising:

a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array;

a driving unit that supplies driving currents to the respective light-emitting elements, the driving currents being based on the corrected signal values; and a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

2. The optical writing device of claim 1 further comprising an optical lens, wherein the optical lens has a plurality of regions each collecting light from one of the light-emitting elements and expose the photoreceptor to the collected light, and the control unit sets the different durations in accordance with positions of the at least two element arrays with respect to the optical lens.

3. The optical writing device of claim 2, wherein the driving unit comprises a plurality of circuits each corresponding to one of the light-emitting elements and each supplying a driving current to the corresponding light-emitting element, the control unit comprises a light emission period control unit transmitting light emission period control signals to the respective circuits, a circuit receiving a light emission period control signal switching between a supply state of supplying a driving current to the corresponding light-emitting element and a non-supply state of not supplying a driving current to the corresponding light-emitting element, the element arrays include a first element array and a second element array that are disposed symmetrically about a virtual central axis of the optical lens, the virtual central axis parallel to the main scanning direction and passing through a center of the optical lens in the sub scanning direction, and light emission period control signals transmitted to ones of the circuits corresponding to light-emitting elements of the first element array and light emission period control signals transmitted to ones of the circuits corresponding to light-emitting elements of the second element array cause the first element array and the second element array to perform light emission for a same duration within one main scanning period.

4. The optical writing device of claim 3, wherein light emission period control signals are transmitted to ones of the circuits corresponding to light-emitting elements in an element array via a signal wiring corresponding to the element array, and light emission period control signals for the first element array and the second element array are transmitted via the same signal wiring.

5. The optical writing device of claim 2, wherein
the optical lens is a rod lens array or a microlens array.

6. The optical writing device of claim 1, wherein
the at least two element arrays include a third element array and a fourth element array such that, when the signal values indicate a same light amount, a difference between the maximum and minimum of light amounts received by the photoreceptor from light-emitting elements of the third element array is greater than a difference between the maximum and minimum of light amounts received by the photoreceptor from light-emitting elements of the fourth element array, and
the third and fourth element arrays are caused to perform light emission for different durations within one main scanning period such that, when the signal values indicate a same light amount and without the correction by the correction unit, a range defined by the maximum and minimum of cumulative light amounts received, within one main scanning period, by the photoreceptor from the light-emitting elements of the third element array includes the maximum and minimum of cumulative light amounts received, within one main scanning period, by the photoreceptor from the light-emitting elements of the fourth element array.

7. The optical writing device of claim 1, wherein
the element arrays are composed of a fifth element array from which the photoreceptor receives a greatest average light amount when the signal values indicate a same light amount, and one or more sixth element arrays being the rest of the element arrays, and
the control unit causes the fifth light-emitting element array to perform light emission for a shorter duration than the sixth light-emitting element arrays within one main scanning period.

8. The optical writing device of claim 7, wherein
the control unit uses a duration for which the sixth element arrays perform light emission within one main scanning period as a standard duration, and
the control unit executes the control with respect to only the fifth light-emitting element array and causes the fifth light-emitting element array to perform light emission for a duration shorter than the standard duration.

9. The optical writing device of claim 1, wherein the light-emitting elements are organic light emitting diodes.

10. An image forming device comprising:
a photoreceptor; and
an optical writing device that executes writing of an image onto the photoreceptor by utilizing light, wherein
the optical writing device includes a plurality of light-emitting elements that form a plurality of element arrays, each of the element arrays including two or more light-emitting elements arranged in line in a main scanning direction, the element arrays arranged at respective positions along a sub-scanning direction, the optical writing device, within one main scanning period, performing writing with respect to the photoreceptor by utilizing light emitted from the light-emitting elements, and
the optical writing device comprises:
a correction unit that receives signal values in one-to-one correspondence with the light-emitting elements and performs correction of the signal values to acquire corrected signal values, each signal value indicating a light amount to be emitted by a corresponding light-emitting element, the correction unit performing the correction for eliminating a light amount difference in the main scanning direction that occurs when the signal values indicate a same light amount, the light amount difference in the main scanning direction occurring for each of the element arrays and being a difference in light amounts that the photoreceptor receives from light emitting elements in one element array;
a driving unit that supplies driving currents to the respective light-emitting elements, the driving currents being based on the corrected signal values; and
a control unit that performs a control of causing at least two of the element arrays to perform light emission for different durations within one main scanning period, the control unit performing the control for eliminating a light amount difference in the sub scanning direction that occurs when the signal values indicate a same light amount, the light amount difference in the sub scanning direction occurring between the at least two element arrays and being a difference in cumulative light amounts that the photoreceptor receives from the at least two element arrays within one main scanning period.

* * * * *